(12) United States Patent
Kawahara

(10) Patent No.: US 7,474,280 B2
(45) Date of Patent: Jan. 6, 2009

(54) IMAGE DISPLAY APPARATUS

(75) Inventor: Isao Kawahara, Osaka (JP)

(73) Assignee: Panasonic Corporation, Osaka (JP)

( * ) Notice: Subject to any disclaimer, the term of this patent is extended or adjusted under 35 U.S.C. 154(b) by 594 days.

(21) Appl. No.: 11/165,868

(22) Filed: Jun. 24, 2005

(65) Prior Publication Data
US 2005/0237277 A1  Oct. 27, 2005

Related U.S. Application Data

(62) Division of application No. 09/701,753, filed on Dec. 1, 2000, now Pat. No. 7,071,902.

(51) Int. Cl.
G09G 3/28 (2006.01)
G09G 5/10 (2006.01)

(52) U.S. Cl. .................... 345/63; 345/60; 345/690

(58) Field of Classification Search ......... 345/690–697, 345/55–100, 204–214
See application file for complete search history.

(56) References Cited

U.S. PATENT DOCUMENTS

| 5,724,053 | A | 3/1998 | Nagakubo |
| 6,097,358 | A | 8/2000 | Hirakawa et al. |
| 6,249,265 | B1 * | 6/2001 | Tajima et al. ............ 345/63 |
| 6,278,422 | B1 | 8/2001 | Ukai et al. |
| 6,310,588 | B1 | 10/2001 | Kawahara et al. |
| 6,335,735 | B1 | 1/2002 | Denda et al. |
| 6,348,930 | B1 | 2/2002 | Kobayashi et al. |
| 6,414,657 | B1 | 7/2002 | Kasahara et al. |
| 6,661,470 | B1 * | 12/2003 | Kawakami et al. .......... 345/474 |
| 6,690,388 | B2 | 2/2004 | Kasahara et al. |
| 2001/0028347 | A1 | 10/2001 | Kawahara et al. |
| 2002/0005857 | A1 | 1/2002 | Kasahara et al. |

FOREIGN PATENT DOCUMENTS

| JP | 01-163794 | 6/1989 |
| JP | 10039833 | 2/1998 |
| JP | 10-153980 | 6/1998 |
| JP | 10307561 | 11/1998 |
| JP | 11052913 | 2/1999 |
| JP | 11085101 | 3/1999 |
| JP | 11-095718 | 4/1999 |

* cited by examiner

Primary Examiner—David L Lewis

(57) ABSTRACT

An image display apparatus using a display panel such as a plasma display panel having two illumination states aims to widen a dynamic range by increasing a ratio of maximum to minimum luminance reproducible on the same screen. In the image display apparatus, one TV field period is divided into a plurality of sub-fields which respectively have luminance weights and are arranged in order of time, and a gray-scale image is displayed by selecting a combination of sub-fields for each pixel and sustaining a light emission state of each pixel during the selected sub-fields, wherein when arranged in ascending order of luminance weight, the plurality of sub-fields include at least one sub-field whose luminance weight is one-half of a luminance weight of the next sub-field.

8 Claims, 26 Drawing Sheets

FIG.2

| INPUT IMAGE SIGNAL | STATIC IMAGE CODING |
|---|---|
| 0 | 0 |
| 1 | 1 |
| 2 | 2 |
| 3 | 3 |
| 4 | 5 |
| 5 | 5 |
| 6 | 6 |
| ⋮ | ⋮ |
| 9 | 10 |
| 10 | 10 |
| 11 | 11 |
| 12 | 12 |
| 13 | 13 |
| 14 | 15 |
| 15 | 15 |
| 16 | 16 |
| ⋮ | ⋮ |
| 20 | 20 |
| 30 | 30 |
| 40 | 40 |
| 50 | 50 |
| 60 | 60 |
| 70 | 70 |
| 80 | 80 |
| 91 | 91 |
| 101 | 101 |
| 111 | 111 |
| 119 | 119 |
| 130 | 130 |
| 140 | 140 |
| 150 | 150 |
| 160 | 160 |
| 170 | 170 |
| 180 | 180 |
| 191 | 191 |
| 201 | 201 |
| 211 | 211 |
| 221 | 221 |
| 231 | 231 |
| 240 | 240 |
| 250 | 250 |
| 260 | 260 |
| 273 | 273 |
| 283 | 283 |
| 293 | 293 |
| 300 | 300 |
| 310 | 310 |
| 320 | 320 |
| 330 | 330 |
| 340 | 340 |
| 350 | 350 |
| 360 | 360 |
| 370 | 370 |
| 380 | 380 |

41 (marks rows 4/5, 9/10, 14/15)

FIG.3

| INPUT IMAGE SIGNAL | MOVING IMAGE CODING |
|---|---|
| 0 | 0 |
| 1 | 1 |
| 2 | 2 |
| 3 | 3 |
| 4 | 5 |
| 5 | 5 |
| 6 | 6 |
| : | : |
| 9 | 10 |
| 10 | 10 |
| 11 | 11 |
| 12 | 12 |
| 13 | 13 |
| 14 | 15 |
| 15 | 15 |
| 16 | 16 |
| : | : |
| 20 | 20 |
| 30 | 30 |
| 40 | |
| 50 | |
| 60 | 60 |
| 70 | |
| 80 | |
| 91 | 91 |
| 101 | 101 |
| 111 | 111 |
| 119 | 119 |
| 130 | |
| 140 | |
| 150 | 150 |
| 160 | 160 |
| 170 | 170 |
| 180 | 180 |
| 191 | |
| 201 | |
| 211 | |
| 221 | 221 |
| 231 | 231 |
| 240 | 240 |
| 250 | 250 |
| 260 | 260 |
| 273 | |
| 283 | |
| 293 | |
| 300 | 300 |
| 310 | 310 |
| 320 | 320 |
| 330 | 330 |
| 340 | 340 |
| 350 | 350 |
| 360 | 360 |
| 370 | 370 |
| 380 | 380 |

FIG.6

| INPUT IMAGE SIGNAL | LUMINANCE WEIGHT | | | | | | | | | |
|---|---|---|---|---|---|---|---|---|---|---|
| | 1(SF1) | 2(SF2) | 5(SF3) | 10(SF4) | 20(SF5) | 33(SF6) | 48(SF7) | 66(SF8) | 87(SF9) | 111(SF10) |
| 0 | | | | | | | | | | |
| 1 | 1 | | | | | | | | | |
| 2 | | 1 | | | | | | | | |
| 3 | 1 | 1 | | | | | | | | |
| 5 | | | 1 | | | | | | | |
| 6 | 1 | | 1 | | | | | | | |
| ⋮ | | | | | | | | | | |
| 10 | | | | 1 | | | | | | |
| 11 | 1 | | | 1 | | | | | | |
| 12 | | 1 | | 1 | | | | | | |
| 13 | 1 | 1 | | 1 | | | | | | |
| 15 | | | 1 | 1 | | | | | | |
| 16 | | | 1 | 1 | | | | | | |
| ⋮ | | | | | | | | | | |
| 20 | | | | | 1 | | | | | |
| 30 | | | | 1 | 1 | | | | | |
| 40 | | 1 | 1 | | 1 | | | | | |
| 50 | | 1 | 1 | 1 | 1 | | | | | |
| 60 | | 1 | 1 | | 1 | 1 | | | | |
| 70 | | 1 | | | 1 | 1 | | | | |
| 80 | | 1 | | 1 | 1 | 1 | | | | |
| 91 | | | | 1 | | 1 | 1 | | | |
| 101 | | | | 1 | 1 | 1 | 1 | | | |
| 111 | | | | 1 | 1 | 1 | 1 | | | |
| 119 | 1 | 1 | 1 | 1 | 1 | 1 | 1 | | | |
| 130 | 1 | | | 1 | 1 | 1 | | 1 | | |
| 140 | 1 | | 1 | | 1 | | 1 | 1 | | |
| 150 | 1 | 1 | | | | 1 | 1 | 1 | | |
| 160 | 1 | 1 | | 1 | | 1 | 1 | 1 | | |
| 170 | 1 | 1 | | | 1 | 1 | 1 | 1 | | |
| 180 | 1 | 1 | | 1 | 1 | 1 | 1 | | | |
| 191 | 1 | 1 | | | 1 | 1 | 1 | | 1 | |
| 201 | 1 | 1 | | 1 | 1 | 1 | 1 | | 1 | |
| 211 | | | 1 | | 1 | 1 | | 1 | 1 | |
| 221 | | | | | 1 | | 1 | 1 | 1 | |
| 231 | | | | 1 | 1 | | 1 | 1 | 1 | |
| 240 | 1 | | | 1 | | 1 | 1 | 1 | 1 | |
| 250 | 1 | | | 1 | 1 | 1 | 1 | 1 | 1 | |
| 260 | 1 | | | 1 | 1 | 1 | 1 | 1 | 1 | |
| 273 | | | 1 | 1 | | 1 | 1 | 1 | | 1 |
| 283 | | | 1 | | 1 | 1 | 1 | 1 | | 1 |
| 293 | | | 1 | 1 | 1 | 1 | 1 | 1 | | 1 |
| 300 | 1 | 1 | | | | 1 | | | 1 | 1 |
| 310 | 1 | 1 | | 1 | | 1 | | | 1 | 1 |
| 320 | 1 | 1 | | | 1 | 1 | | 1 | 1 | 1 |
| 330 | 1 | 1 | | 1 | 1 | 1 | | 1 | 1 | 1 |
| 340 | 1 | 1 | 1 | | 1 | | 1 | 1 | 1 | 1 |
| 350 | | | 1 | | | 1 | 1 | 1 | 1 | 1 |
| 360 | | | 1 | 1 | | 1 | 1 | 1 | 1 | 1 |
| 370 | | | 1 | | 1 | 1 | 1 | 1 | | 1 |
| 380 | | | | 1 | 1 | 1 | 1 | 1 | 1 | 1 |

INPUT IMAGE SIGNAL            INPUT IMAGE SIGNAL

| INPUT LEVEL | SUB-FIELD LUMINANCE WEIGHTING | | | | | | | |
|---|---|---|---|---|---|---|---|---|
| | 1 | 2 | 4 | 8 | 16 | 32 | 64 | 128 |
| 0 | | | | | | | | |
| 1 | 1 | | | | | | | |
| 2 | | 1 | | | | | | |
| 3 | 1 | 1 | | | | | | |
| 4 | | | 1 | | | | | |
| 5 | 1 | | 1 | | | | | |
| ... | | | | | | | | |
| 31 | 1 | 1 | 1 | 1 | 1 | | | |
| 32 | | | | | | 1 | | |
| ... | | | | | | | | |
| 63 | 1 | 1 | 1 | 1 | 1 | 1 | | |
| 64 | | | | | | | 1 | |
| 65 | 1 | | | | | | 1 | |
| ... | | | | | | | | |
| 127 | 1 | 1 | 1 | 1 | 1 | 1 | 1 | |
| 128 | | | | | | | | 1 |
| 129 | 1 | | | | | | | 1 |
| ... | | | | | | | | |
| 254 | | 1 | 1 | 1 | 1 | 1 | 1 | 1 |
| 255 | 1 | 1 | 1 | 1 | 1 | 1 | 1 | 1 |

(b)

| INPUT LEVEL | SUB-FIELD LUMINANCE WEIGHTING | | | | | | | |
|---|---|---|---|---|---|---|---|---|
| | 1 | 2 | 4 | 8 | 16 | 32 | 64 | 128 |
| 0 | | | | | | | | |
| 1 | 1 | | | | | | | |
| 2 | | 1 | | | | | | |
| 3 | 1 | 1 | | | | | | |
| 4 | | | 1 | | | | | |
| 5−6 | 1 | | 1 | | | | | |
| 7−8 | 1 | 1 | 1 | | | | | |
| 9−12 | 1 | 1 | 1 | 1 | | | | |
| 13−18 | 1 | 1 | 1 | 1 | | | | |
| 19−26 | 1 | 1 | 1 | | 1 | | | |
| 27−38 | 1 | 1 | 1 | 1 | 1 | | | |
| 39−54 | 1 | 1 | 1 | 1 | | 1 | | |
| 55−78 | 1 | 1 | 1 | 1 | 1 | 1 | | |
| 79−110 | 1 | 1 | 1 | 1 | 1 | | 1 | |
| 111−158 | 1 | 1 | 1 | 1 | 1 | 1 | 1 | |
| 159−222 | 1 | 1 | 1 | 1 | 1 | 1 | | 1 |
| 223−255 | 1 | 1 | 1 | 1 | 1 | 1 | 1 | 1 |

(c)

| INPUT LEVEL | SUB-FIELD LUMINANCE WEIGHTING | | | | | | | |
|---|---|---|---|---|---|---|---|---|
| | 1 | 2 | 4 | 8 | 16 | 32 | 64 | 128 |
| 0 | | | | | | | | |
| 1−2 | 1 | | | | | | | |
| 3−5 | 1 | 1 | | | | | | |
| 6−11 | 1 | 1 | 1 | | | | | |
| 12−23 | 1 | 1 | 1 | 1 | | | | |
| 24−47 | 1 | 1 | 1 | 1 | 1 | | | |
| 48−95 | 1 | 1 | 1 | 1 | 1 | 1 | | |
| 96−191 | 1 | 1 | 1 | 1 | 1 | 1 | 1 | |
| 192−255 | 1 | 1 | 1 | 1 | 1 | 1 | 1 | 1 |

IMAGE DISPLAY APPARATUS

CROSS-REFERENCE TO RELATED APPLICATIONS

This application is a divisional application of U.S. Ser. No. 09/701,753 filed on Dec. 1, 2000 now U.S. Pat. No. 7,071,902.

TECHNICAL FIELD

The present invention relates to an image display apparatus which uses a display panel such as a plasma display panel that divides one TV field period into a plurality of sub-fields to display a gray-scale image, the display apparatus being capable of displaying an image of a wide dynamic range by increasing a ratio of maximum to minimum luminance reproducible on the same screen.

The invention further relates to an image display apparatus that divides one TV field period into a plurality of sub-fields to display a gray-scale image, the display apparatus being capable of reducing halftone disturbances which occur when displaying a moving image.

BACKGROUND ART

To display a gray-scale image on a display panel such as a plasma display panel that is fundamentally only capable of two display states, a method is widely employed that separates one TV field period into sub-fields, assigns predetermined luminance weights to the sub-fields, and controls the presence or absence of light emission of each sub-field.

For instance, 256 levels of gray are represented by dividing a TV field period into eight sub-fields that are respectively given the luminance weights of "1", "2", "4", "8", "16", "32", "64", and "128". When an input image signal is an 8-bit digital signal, then the 8 bits are respectively assigned to the eight sub-fields starting with the least significant bit. Here, each sub-field image has two display states.

A CRT display bears the so-called inverse gamma property, so that while maximum luminance is proportional to "255", minimum luminance is proportional to a decimal no greater than "1". Hence the dynamic range is kept at a sufficient level of 255 or higher.

On the other hand, a plasma display panel has a linear luminous property, so that a gray level is expressed by a sum of luminance levels substantially proportional to sub-field weights. Which is to say, while maximum luminance is proportional to a sum of luminance weights of all sub-fields, i.e. "255", minimum luminance is proportional to "1". Because of this greater minimum luminance than that of the CRT, the dynamic range of the plasma display panel is narrower than the CRT.

The dynamic range of the plasma display panel may be widened by increasing the number of sub-fields so as to increase the number of reproducible levels of gray, but this technique is not easy to implement due to restrictions such as discharge speeds of plasma display panels. Therefore, the number of sub-fields is normally limited.

Also, the aforementioned method of expressing 256 levels of gray using the eight sub-fields is known to be susceptible to halftone disturbances with significant false contours which appear when displaying a moving image.

To reduce such halftone disturbances, a technique has been devised that detects motion in an image and switches coding for each pixel or each image portion in the image.

As an example of this technique, coding is varied for each image portion such that when input is made in 256-level gray scale, light emission is effected in 256 levels of gray for a static image portion, while light emission is effected in a more limited number of gray levels for a moving image portion. In so doing, the moving image portion is coded so that the light-emission pattern changes with a certain degree of continuity against monotonous gray level changes of input image signals. This benefits a reduction of annoying false contours in the moving image display. Meanwhile, a desired sufficient gray scale is guaranteed in the static image display.

In such a conventional method, however, coding is switched at the boundary of the moving and static portions. In some images, this switching causes a certain impact on the boundary area. The impact of the switching is particularly well observed in boundaries of an object that is moving in plane within an image.

DISCLOSURE OF INVENTION

To solve the stated problems, the first object of the invention is to provide an image display apparatus equipped with a plasma display panel or the like, that divides one TV field period into a plurality of sub-fields to produce a gray-scale image, and that can display an image with a truly wide dynamic range by increasing a ratio between maximum and minimum luminance reproducible on the same screen.

The second object of the invention is to provide a gray-scale image display apparatus that not only reduces halftone disturbances which appear when displaying a moving image, but lessens an impact of switching between different coding modes.

The first object can be fulfilled by an image display apparatus, in which a current TV field period is divided into a plurality of sub-fields that are respectively given luminance weights and are arranged in order of time, and a gray-scale image for the current TV field period is displayed by selecting a combination of sub-fields for each pixel and sustaining a light emission state in each pixel during the selected sub-fields, characterized in that when arranged in ascending order of luminance weight, the plurality of sub-fields include at least one sub-field whose luminance weight is smaller than one-half of a luminance weight of the next sub-field.

The first object can also be fulfilled by an image display apparatus, in which a current TV field period is divided into a plurality of sub-fields that are respectively given luminance weights and are arranged in order of time, and a gray-scale image for the current TV field period is displayed by selecting a combination of sub-fields for each pixel and sustaining a light emission state in each pixel during the selected sub-fields, characterized in that when the plurality of sub-fields are arranged in ascending order of luminance weight with an "i"th smallest luminance weight being denoted by $W_i$, the plurality of sub-fields are respectively given such luminance weights that "n" exists where $W_1+W_1+W_2+\ldots+W_n<W_{n+1}$.

With this construction, when all reproducible luminance levels (gray levels) are rearranged in ascending order of luminance level (gray level), the luminance level (gray level) jumps by one or more levels at certain points. This makes it possible to increase the ratio between minimum to maximum luminance reproducible on the same screen, in comparison with the conventional techniques. As a result, an image display of a wide dynamic range can be realized.

The first object can also be fulfilled by an image display apparatus, in which a current TV field period is divided into a plurality of sub-fields that are respectively given luminance weights and are arranged in order of time, and a gray-scale image for the current TV field period is displayed by selecting a combination of sub-fields for each pixel and sustaining a light emission state in each pixel during the selected sub-fields, characterized in that when the plurality of sub-fields are arranged in ascending order of luminance weight with a "j"th smallest luminance weight being denoted by $W_j$, the plurality of sub-fields are respectively given such luminance weights that "n" and at least two "i"s exist where $W_i + W_1 + W_2 + \ldots + W_n < W_{n+1}$.

With this construction, when all reproducible luminance levels (gray levels) are rearranged in ascending order of luminance level (gray level), the luminance level (gray level) jumps by one or more levels at certain points. This makes it possible to increase the ratio between minimum to maximum luminance reproducible on the same screen, in comparison with the conventional techniques. As a result, an image display of a wide dynamic range can be realized. Furthermore, the amounts of jumps in luminance level can be controlled in accordance with gray levels of input image signals. For instance, the higher the input gray level, the luminance level is made to jump by a greater amount. This further increases the reproducible maximum luminance.

The first object can also be fulfilled by an image display apparatus, in which a current TV field period is divided into a plurality of sub-fields that are respectively given luminance weights and are arranged in order of time, and a gray-scale image for the current TV field period is displayed by selecting a combination of sub-fields for each pixel and sustaining a light emission state in each pixel during the selected sub-fields, wherein a coding pattern that specifies a sum of luminance weights of all sub-fields in the current TV field period is determined in accordance with a characteristic of input pixel image signals corresponding to the image of the current TV field period, characterized in that when a reference TV field period is divided into a plurality of sub-fields that are respectively given luminance weights, and a ratio of the sum of luminance weights of all sub-fields in the current TV field period to a sum of luminance weights of all sub-fields in the reference TV field period is denoted by K, the current TV field period includes (a) one or more sub-fields whose luminance weights are obtained by multiplying luminance weights of predetermined sub-fields in the reference TV field period, respectively by coefficients no greater than K, and (b) one or more sub-fields whose luminance weights are obtained by multiplying luminance weights of predetermined sub-fields in the reference TV field period, respectively by coefficients greater than K.

With this construction, the reproducible minimum luminance is kept low, while the reproducible maximum luminance is controlled in accordance with a distribution of gray levels in an image. In general, when an image contains an area of relatively high brightness, if the reproducible maximum luminance is raised higher than necessary, there is a danger that the total power consumption may increase in a display device such as a plasma display panel where power consumption closely correlates with reproduced luminance. Therefore, it is desirable to control the reproducible maximum luminance depending on the characteristic of the image. To be more specific, low luminance weights of sub-fields are always kept relatively low, whereas high luminance weights of sub-fields are changed according to a desired maximum luminance level. Accordingly, the ratio of maximum to minimum luminance is increased. Also, even if the maximum luminance is reproduced at a high level, the corresponding image area will not be isolated within the image, and good contrast will not be impaired.

Here, the coefficients no greater than K and the coefficients greater than K may be determined based on a rule which is defined by an ascending order of luminance weight in the reference TV field period.

Here, the coefficients determined based on the rule may be coefficients that monotonously increase in ascending order of luminance weight in the reference TV field period.

Here, the coefficients determined based on the rule may be coefficients that increase in arithmetic progression in ascending order of luminance weight in the reference TV field period.

Here, the coefficients determined based on the rule may be coefficients that increase in geometric progression in ascending order of luminance weight in the reference TV field period.

Here, the sub-fields whose luminance weights are obtained by the multiplications by the coefficients no greater than K may include a sub-field whose luminance weight is obtained by a multiplication by a coefficient within a range that is fixed irrespective of which value K takes.

Here, in each of at least two coding patterns among a plurality of coding patterns from which the coding pattern of the current TV field period is selected, at least two sets of three luminance weights selected in ascending order of luminance weight may each meet the condition that the three luminance weights approximately have a proportion selected from the group consisting of "1:2:3", "1:2:4", "1:2:5", "1:2:6", "1:3:7", "1:4:9" "2:6:12", and "2:6:16".

Here, when S denotes the sum of luminance weights of all sub-fields in the current TV field period and R is within a range from 0 to S, a gray level corresponding to R may be expressed by selecting a combination of sub-fields whose luminance weights, when added together, are closest to R.

With this construction, a gray level which cannot be expressed with a single combination of sub-fields can be corrected using a known gray level correction technique such as error diffusion or dithering. Accordingly, the minimum luminance is kept low, whereas the reproducible maximum luminance is made high, with it being possible to produce an excellent image display of a wide dynamic range with corrected, smooth gray levels.

Here, the selection of the combination of sub-fields for each pixel may be controlled in accordance with one out of: an amount of movement from an image of a past TV field period to the image of the current TV field period; and an approximate value of the amount of movement.

With this construction, the minimum luminance is kept low, whereas the reproducible maximum luminance is made high, with it being possible to produce an excellent image display of a wide dynamic range with corrected, smooth gray levels. Moreover, the occurrence of false contours in a moving image can be suppressed.

Note that moving image false contours occur when a viewer's eyes move relative to a subject within an image. Still, false contours can be substantially suppressed by using an amount of movement in an image or an approximate value of the amount of movement.

Here, in an image area where the amount of movement or the approximate value of the amount of movement is large, such combinations of sub-fields may be selected that monotonously increase in time with increasing gray levels of input pixel image signals.

With this construction, when the input gray level rises, no sub-field is switched from the ON to the OFF state, or only sub-fields with relatively small luminance weights are switched from the ON to the OFF state. In so doing, the occurrence of moving image false contours is suppressed more effectively.

The second object can be fulfilled by an image display apparatus, in which a current TV field period is divided into a plurality of sub-fields that are respectively given luminance weights and are arranged in order of time, and a gray-scale image for the current TV field period is displayed by coding input pixel image signals using different coding modes that are switched in accordance with an amount of movement from an image of a past TV field period to the image of the current TV field period, wherein a combination of sub-fields is selected for each pixel depending on the amount of movement, and a light emission state is sustained in each pixel during the selected sub-fields, characterized in that the different coding modes are interspersedly applied to input pixel image signals that correspond to an image area where switching between the different coding modes is needed and that show a predetermined characteristic.

The second object can also be fulfilled by an image display apparatus, in which a current TV field period is divided into a plurality of sub-fields that are respectively given luminance weights and are arranged in order of time, and a gray-scale image for the current TV field period is displayed by coding input pixel image signals using different coding modes that are switched in accordance with an amount of movement from an image of a past TV field period to the image of the current TV field period, wherein a combination of sub-fields is selected for each pixel depending on the amount of movement, and a light emission state is sustained in each pixel during the selected sub-fields, characterized in that a signal used for switching between the different coding modes is arbitrarily space-modulated so that the different coding modes are interspersedly applied to input pixel image signals that correspond to an image area where the switching between the different coding modes is needed and that show a predetermined characteristic.

The second object can also be fulfilled by an image display apparatus, in which a current TV field period is divided into a plurality of sub-fields that are respectively given luminance weights and are arranged in order of time, and a gray-scale image for the current TV field period is displayed by coding input pixel image signals using different coding modes that are switched in accordance with an amount of movement from an image of a past TV field period to the image of the current TV field period, wherein a combination of sub-fields is selected for each pixel depending on the amount of movement, and a light emission state is sustained in each pixel during the selected sub-fields, characterized in that a signal used for switching between the different coding modes is regularly space-modulated so that the different coding modes are interspersedly applied to input pixel image signals that correspond to an image area where the switching between the different coding modes is needed and that show a predetermined characteristic.

The second object can also be fulfilled by an image display apparatus, in which a current TV field period is divided into a plurality of sub-fields that are respectively given luminance weights and are arranged in order of time, and a gray-scale image for the current TV field period is displayed by coding input pixel image signals using different coding modes which are switched in accordance with an amount of movement from an image of a past TV field period to the image of the current TV field period, wherein a combination of sub-fields is selected for each pixel depending on the amount of movement, and a light emission state is sustained in each pixel during the selected sub-fields, characterized in that a signal used for switching between the different coding modes, when expressed pixel by pixel as a virtual image of a matrix form in a plane, assumes a shape that contains a zigzag as a main component which turns no more than once in a pixel, so that the different coding modes are interspersedly applied to input pixel image signals that correspond to an image area where the switching between the different coding modes is needed and that show a predetermined characteristic.

With these constructions, the switching between the different coding modes is performed gradually, so that an impact of the switching is alleviated while suppressing moving image false contours. This benefits smooth switching between different coding modes such as static image coding and moving image coding.

Here, the shape that contains the zigzag as the main component may have a pattern in which adjacent pixels alternate between two states.

Here, the shape that contains the zigzag as the main component may be a shape that randomly combines zigzags each of which turns no more than once in a pixel.

Here, the input pixel image signals that show the predetermined characteristic may correspond to a non-edge image area.

With this construction, an impact of the switching between the different coding modes is suppressed in the non-edge image area that is particularly susceptible to such an impact, while the switching of the different coding modes is swiftly performed in the edge image area. Hence coding that is suitable for each image area is accomplished without decreasing the average signal-to-noise ratio of the whole image.

The second object can also be fulfilled by an image display apparatus, in which a current TV field period is divided into a plurality of sub-fields that are respectively given luminance weights and are arranged in order of time, and a gray-scale image for the current TV field period is displayed by coding input pixel image signals using different coding modes which are switched in accordance with an amount of movement from an image of a past TV field period to the image of the current TV field period, wherein a combination of sub-fields is selected for each. pixel depending on the amount of movement, and a light emission state is sustained in each pixel during the selected sub-fields, characterized in that a modulation signal having periodicity corresponding to no smaller than a pixel interval is applied to input pixel image signals that correspond to an image area where switching between the different coding modes is needed.

The second object can further be fulfilled by an image display apparatus, in which a current TV field period is divided into a plurality of sub-fields that are respectively given luminance weights and are arranged in order of time, and a gray-scale image for the current TV field period is displayed by coding input pixel image signals using different coding modes which are switched in accordance with an amount of movement from an image of a past TV field period to the image of the current TV field period, wherein a combination of sub-fields is selected for each pixel depending on the amount of movement, and a light emission state is sustained in each pixel during the selected sub-fields, characterized in that input pixel image signals corresponding to an image area where switching between the different coding modes is needed are modulated to shift a display position of the image area.

With these constructions, the switching between the different coding modes is performed gradually, so that an impact of the switching is alleviated while suppressing moving image false contours. This benefits smooth switching between different coding modes such as static image coding and moving image coding.

BRIEF DESCRIPTION OF THE DRAWINGS

FIG. 2 shows the correspondence between input image signal values and converted image signal values in a static image coding circuit;

FIG. 3 shows the correspondence between input image signal values and converted image signal values in a moving image coding circuit;

FIG. 6 shows the correspondence between input image signal values and field information;

FIGS. 12(a)-12(e) are diagrams showing a process of switching coding patterns based on a value of K in the sub-field control circuit (prior art);

FIG. 21 shows coding modes of respective image coding circuits;

BEST MODE FOR CARRYING OUT THE INVENTION

The following is a description of an image display apparatus according to embodiments of the invention, with reference to the figures.

First Embodiment

General Construction

An image display apparatus of the first embodiment uses an AC-type plasma display panel (hereinafter, "PDP"). This image display apparatus produces a halftone image by expressing a gray scale with a sum of light emissions for a predetermined number of sub-fields (e.g. ten sub-fields) that are respectively assigned predetermined numbers of light-emission pulses as luminance weights.

Figure 1:
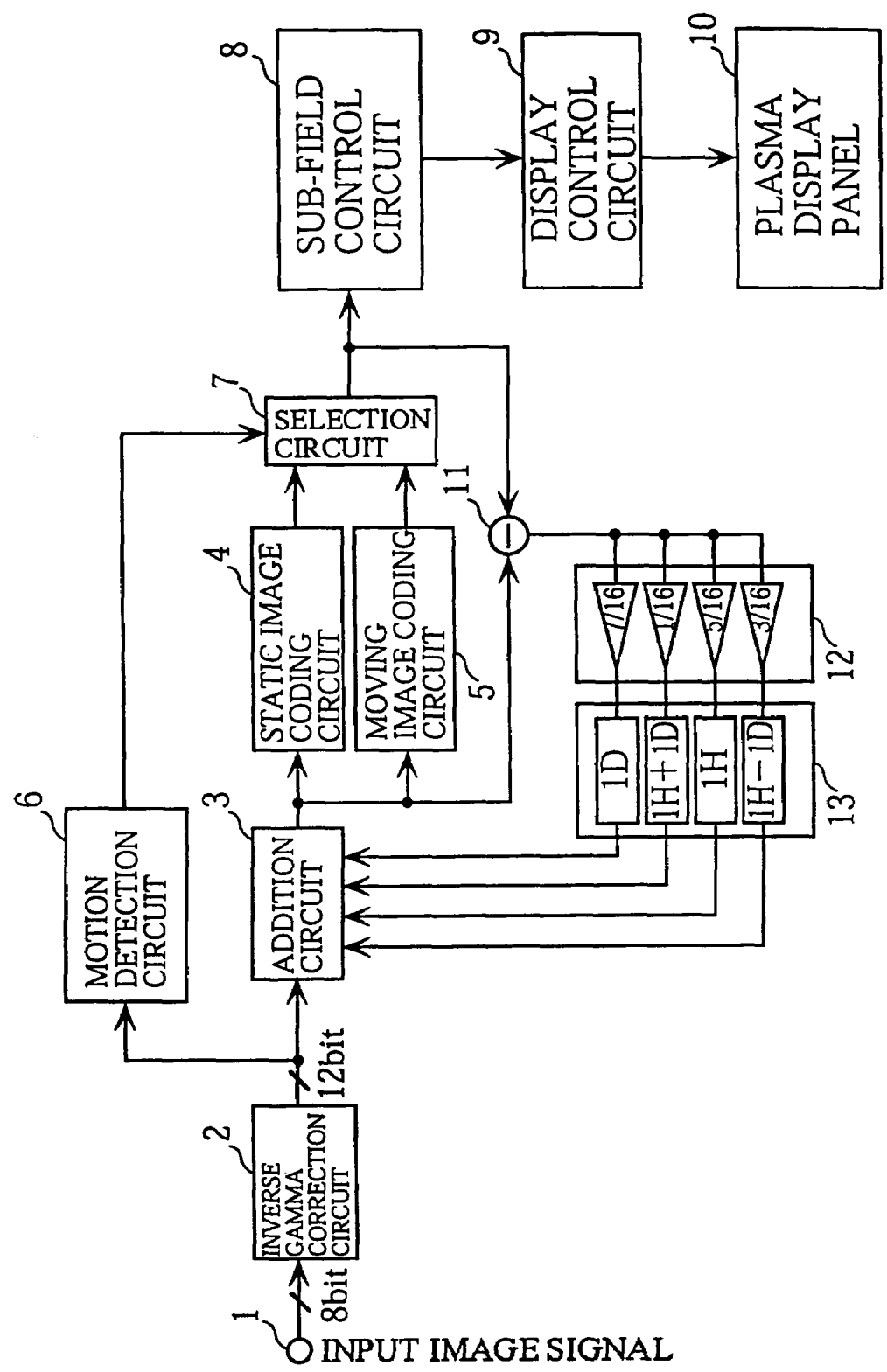
FIG. 1 is a block diagram showing a construction of an image display apparatus according to the first embodiment of the invention.

FIG. 1 is a block diagram showing a construction of this image display apparatus.

As shown in the figure, the image display apparatus is roughly made up of an inverse gamma correction circuit 2, an addition circuit 3, a static image coding circuit 4, a moving image coding circuit 5, a motion detection circuit 6, a selection circuit 7, a sub-field control circuit 8, a display control circuit 9, an AC-type plasma display panel 10 (hereinafter, "PDP 10"), a differential circuit 11, a group of coefficient circuits 12, and a group of delay circuits 13.

The inverse gamma correction circuit 2 is a circuit which performs such exponential correction as to decrease a reproduced luminance level when a gray level indicated by an input image signal 1 is low. Which is to say, the inverse gamma correction circuit 2 is constructed so as to output a 12-bit image signal by adding a 4-bit decimal to an 8-bit input image signal. Given that the input image signal 1 is generally premised on the inverse gamma characteristic of a CRT, in the case of a PDP that digitally controls reproduced luminance by the number of light-emission pulses, the relation between an input gray level and a reproduced luminance level assumes linearity, as a result of which the gray level cannot be expressed properly. The inverse gamma correction circuit 2 serves to overcome this problem.

The signal having passed through the addition circuit 3 is supplied to the static image coding circuit 4 and the moving image coding circuit 5. The static image coding circuit 4 has a look-up table that associates each gray level with a value to which the gray level is to be converted. The static image coding circuit 4 performs coding in accordance with this table. FIG. 2 shows part of the look-up table, where the left column shows input image signal values and the right column shows signal values to which the input image signal values should be converted.

As illustrated, input image signal values are basically converted to the same values as the original, but some values such as "4", "9", "14", ... (designated by the thick line boxes 41) are converted to values that are close to but different with the original values (e.g. "4" converted to "5", "9" converted to "10", "14" converted to "15"). The purposes of this structure are to express every input image signal value with a certain value in correspondence with the coding in the sub-field control circuit 8 (i.e. the coding that divides into sub-fields with predetermined luminance weights), and to cause such jumps in transitions between luminance levels that will hamper consecutive luminance level transitions.

Likewise, the moving image coding circuit 5 has a look-up table that associates each input gray level with a value to which the gray level is to be converted, and performs coding based on this table. FIG. 3 shows part of the look-up table, where the left column shows input image signal values and the right column shows signal values to which the input image signal values should be converted.

As illustrated, input image signal values are basically converted to the same values as the original, but some values such as "4", "9", "14", . . . (designated by the thick line boxes 51) are converted to values which are close to but different with the original values (e.g. "4" converted to "5", "9" converted to "10", "14" converted to "15"), as with the look-up table in FIG. 2. This is intended to express every input image signal value with a certain value in correspondence with the coding in the sub-field control circuit 8, as well as to cause such jumps in transitions between luminance levels that will hamper consecutive luminance level transitions. Moreover, the moving image coding circuit 5 exercises unique coding unlike the static image coding circuit 4. In the moving image coding mode, predetermined input image signal values such as "40", "50", "70", "80", . . . (designated by the shaded areas 52), despite being able to be expressed on the PDP using sums of sub-field luminance weights, are converted to neighboring values in order to ensure the correlation between changes of input image signal values and changes of light-emission patterns of the predetermined number of sub-fields (e.g. "40" converted to "30", "50" converted to "60").

Figure 4:
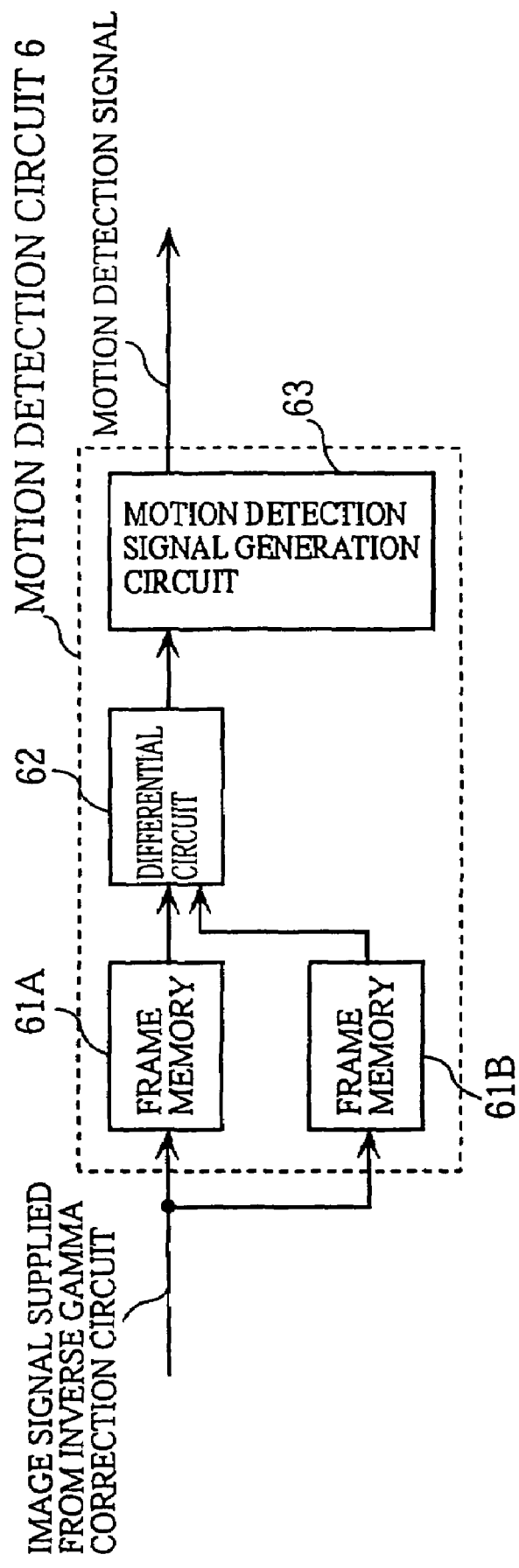
FIG. 4 is a block diagram showing a construction of a motion detection circuit.

FIG. 4 is a block diagram showing a detailed construction of the motion detection circuit 6.

In the figure, the motion detection circuit 6 includes two frame memories 61A and 61B each for storing image signals of one frame supplied from the inverse gamma correction circuit 2, a differential circuit 62, and a motion detection signal generation circuit 63.

The differential circuit 62 reads image signals of a current frame and image signals of an immediately preceding frame from the frame memories 61A and 61B, compares them for corresponding pixels, and calculates a difference for each pixel. The difference is then supplied to the motion detection signal generation circuit 63. If the difference exceeds a reference value, the motion detection signal generation circuit 63 judges the pixel as having a motion status, whereas if the difference does not exceed the reference value, the motion detection signal generation circuit 63 judges the pixel as having a static status. The motion detection signal generation circuit 63 generates a motion detection signal indicative of the judgement result, and outputs it to the selection circuit 7.

The selection circuit 7 uses the supplied motion detection signal that indicates whether the pixel has a static or motion status, as a selection signal. According to this selection signal, the selection circuit 7 selects either an image signal outputted from the static image coding circuit 4 or an image signal outputted from the moving image coding circuit 5. The selection circuit 7 then supplies the selected image signal to the sub-field control circuit 8 and the differential circuit 11.

Figure 5:
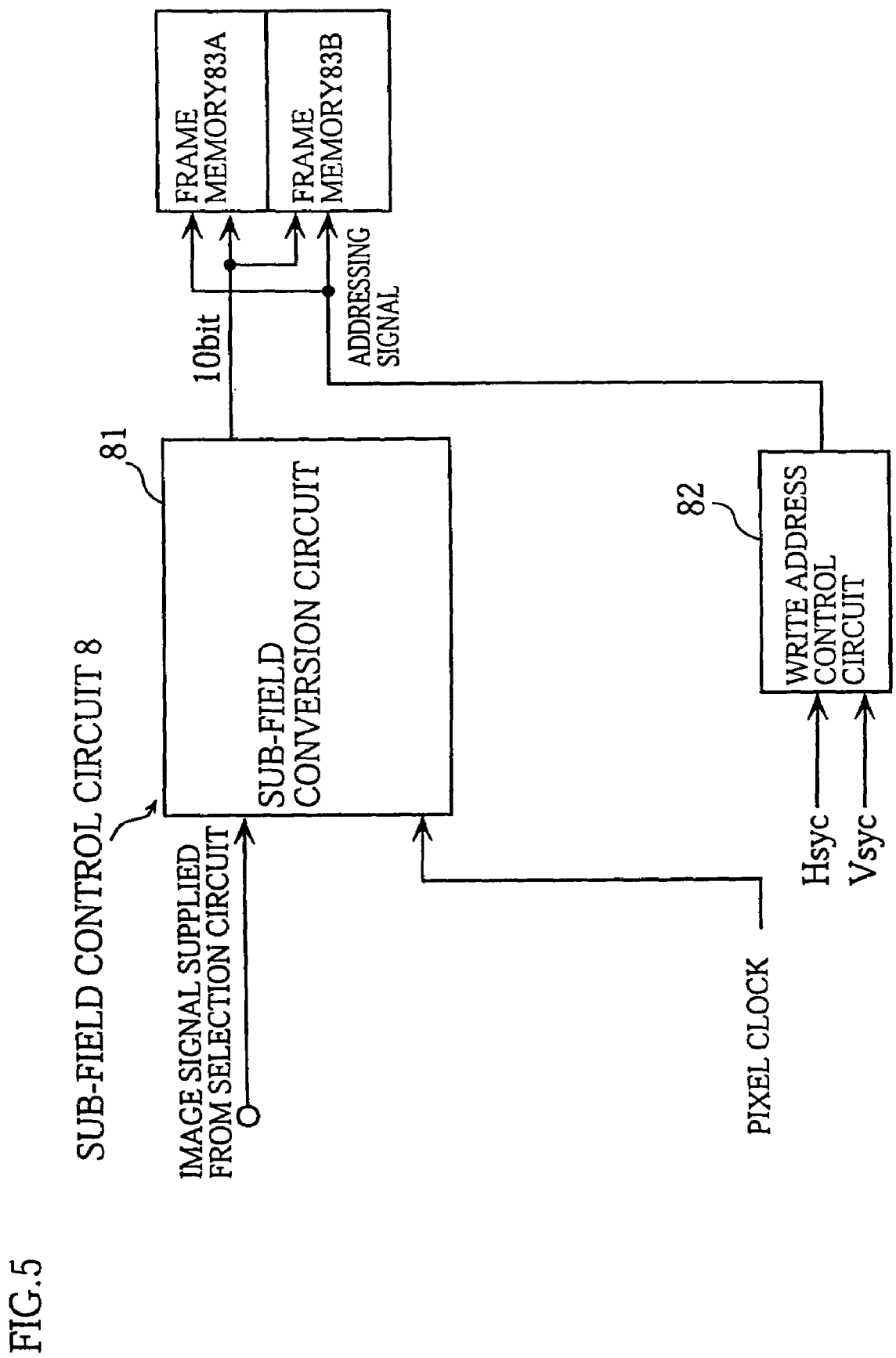
FIG. 5 is a block diagram showing a construction of a sub-field control circuit.

FIG. 5 is a block diagram showing a construction of the sub-field control circuit 8.

As shown in the figure, the sub-field control circuit 8 is mainly made up of a sub-field conversion circuit 81, a write address control circuit 82, and frame memories 83A and 83B.

The write address control circuit 82 generates an addressing signal which specifies a write address in the frame memories 83A and 83B, based on a horizontal synchronous signal (Hsync) and a vertical synchronous signal (Vsync) which have been separated from the image signal.

The sub-field conversion circuit 81 receives the image signal from the selection circuit 7. The sub-field conversion circuit 81 is a circuit that converts an image signal of each pixel that corresponds to the current frame into field information of, in this embodiment, 10 bits which each have a predetermined weight. More specifically, each image signal for one frame is divided into a predetermined number of sub-fields, based on a look-up table that defines converted information for a gray level of an input image signal (i.e. an input image signal before passing through the static image coding circuit 4 or the moving image coding circuit 5). This division for each pixel image signal is carried out in sync with a pixel clock generated by a PLL circuit (not illustrated).

The field information mentioned above is a group of 1-bit sub-field information indicating which periods within one TV field period, i.e. sub-fields, should be illuminated. For such generated field information corresponding to each pixel a physical address is specified by the addressing signal outputted from the write address control circuit 82, and the field information is written into the frame memories 83A and 83B for each line, pixel, field, and frame.

FIG. 6 shows the correspondence between input image signal values (gray levels) and information to which each input image signal value is to be converted, in the sub-field conversion circuit 81.

The figure shows a table of the correspondence between input image signal values and sub-field combinations after conversion, which is used for converting each input image signal value into 10-bit field information of ON/OFF states of sub-fields SF1-SF10 that have varying luminance weights of "1", "2", "5", "10", "20", "33", "48", "66", "87", and "111" in order of time. In the table, the leftmost column shows input image signal values, whereas the remaining columns show 10-bit field information to which each input image signal value should be converted. In the field information, "1" means the pixel is ON (illuminated) during that sub-field. Otherwise, the pixel is OFF (not illuminated) during that sub-field (the same applies hereafter).

For instance, when an input image signal is "40" (designated by the thick line box 84), the sub-field conversion circuit 81 converts the image signal to 10-bit data "0000100110" that shows the combination of the sub-fields with the luminance weights "2", "5", and "33", and outputs the 10-bit data. The bits here are represented in such a way that digits in bit representation correspond to sub-field numbers.

Figure 7:
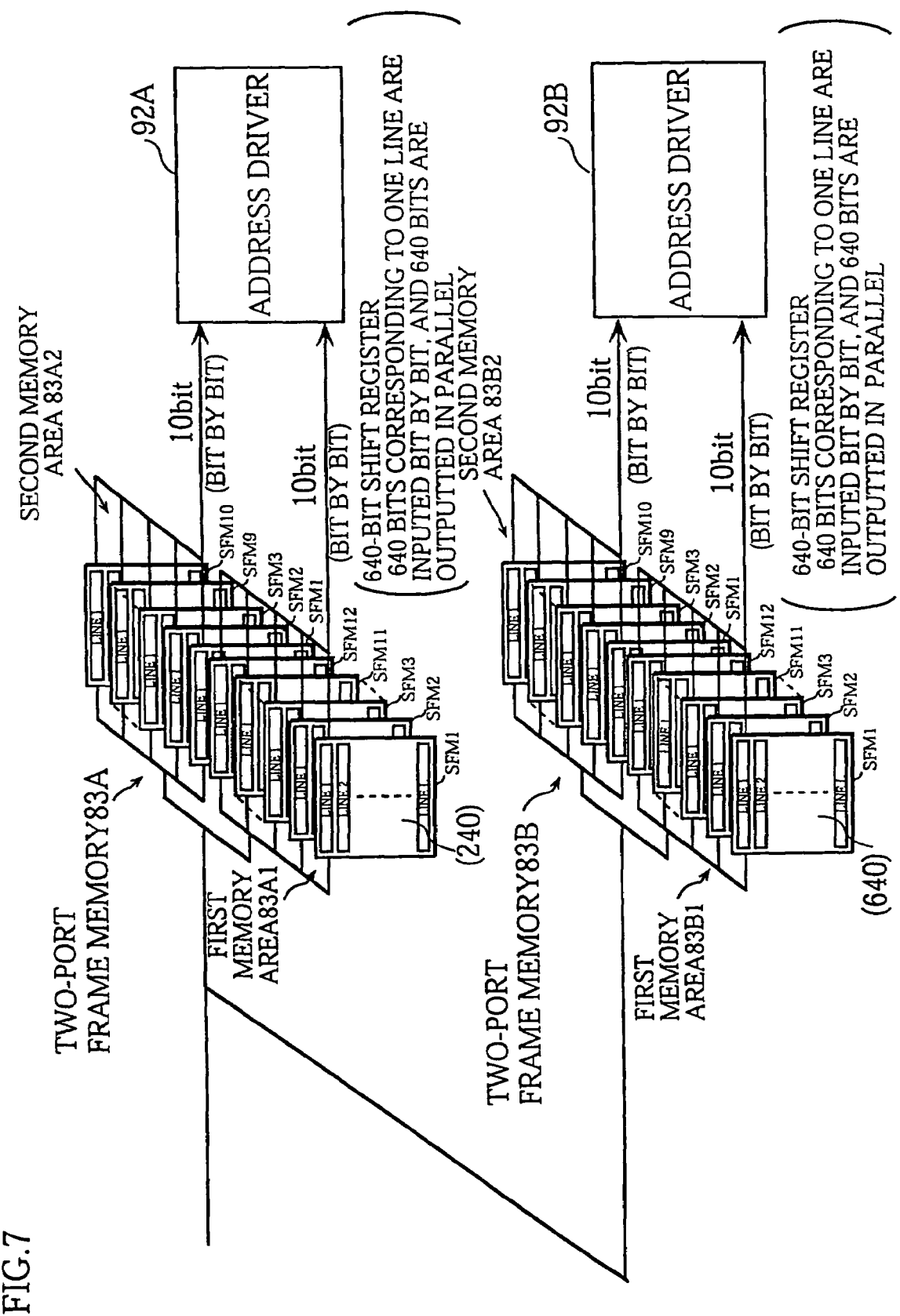
FIG. 7 shows constructions of frame memories in the sub-field control circuit.

The structures of the frame memories 83A and 83B are shown in FIG. 7. The frame memory 83A is provided with a first memory area 83A1 for storing field information equivalent to the first half (1 to L (240) lines) of one frame, and a second memory area 83A2 for storing field information equivalent to the first half (1 to L (240) lines) of another frame.

The frame memory 83B is provided with a first memory area 83B1 for storing field information equivalent to the latter half (L+1 to 2L (480) lines) of one frame, and a second memory area 83B2 for storing field information equivalent to the latter half (L+1 to 2L (480) lines) of another frame.

The first memory area 83A1 (the first memory area 83B1) and the second memory area 83A2 (the second memory area 83B2) each have 10 sub-field memories SFM1 to SFM10. With these structures, two frames are each divided into halves, and field information showing a combination of sub-fields of 10 bits for each pixel of each of the half frames is written in the sub-field memories SFM1-SFM10 as information concerning the ON/OFF states of the sub-fields. In this embodiment, semiconductor memories of 1-bit input and 1-bit output are used as the sub-field memories SFM1-SFM10. Also, the frame memories 83A and 83B are two-port frame memories in which writing of field information and reading of field information can be carried out simultaneously.

Writing field information into the four memory areas 83A1, 83B1, 83A2, and 83B2 in the frame memories 83A and 83B is performed alternately in such a manner that field information for the first half of a frame is written the first memory area 83A1, field information for the latter half of the frame is written in the first memory area 83B1, field information for the first half of the next frame is written in the second memory area 83A2, and then field information for the latter half of the next frame is written in the second memory area 83B2. This writing of field information into each of the memory areas 83A1, 83B1, 83A2, and 83B2 is done by directing each bit of the 10-bit data, which is outputted from the sub-field conversion circuit 81 in sync with the pixel clock, to a different one of the sub-field memories SFM1-SFM10. Here, it is predetermined as to which bits in the 10-bit data should be written into the respective sub-field memories SFM1-SFM10.

Figure 8:
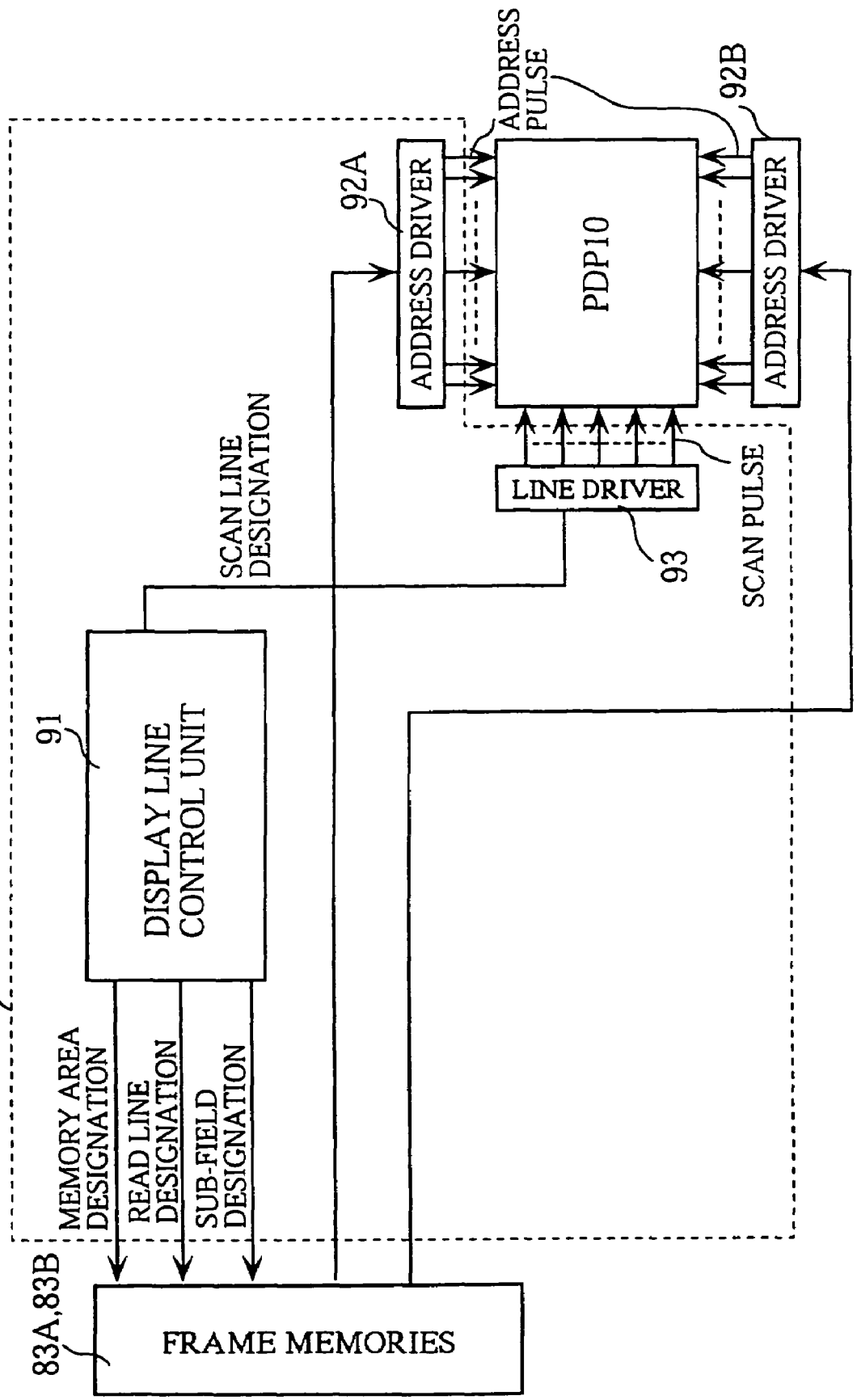
FIG. 8 is a block diagram showing a construction of a display control circuit.

The display control circuit 9 is roughly made up of a display line control circuit 91, address drivers 92A and 92B, and a line driver 93, as shown in FIG. 8.

The display line control unit 91 indicates, to the frame memories 83A and 83B, which of the memory areas 83A1, 83B1, 83A2, and 83B2, which line, and which sub-field should be read to the PDP 10. The display line control unit 91 also indicates, to the PDP 10, which line should be scanned.

The operation of the display line control unit 91 is synchronized with the operation of writing into the frame memories 83A and 83B in the sub-field control circuit 8, in units of frames. That is to say, the display line control unit 91 does not designate reading from the memory area 83A2/83B2 (or 83A1/83B1) in which field information is being written, but designates reading from the memory area 83A1/83B1 (or 83A2/83B2) in which field information has already been written.

The address driver 92A converts 640 bits of sub-field information corresponding to one line's worth of pixels, which have been serially inputted bit by bit in accordance with the memory area designation, read line designation, and sub-field designation made by the display line control unit 91, into address pulses. The address driver 92A then outputs the address pulses in parallel to an appropriate line in the first half of the screen. The address driver 92B converts 640 bits of sub-field information into address pulses and outputs them to an appropriate line in the latter half of the screen, in the same way as the address driver 92A.

The line driver 93 designates, through a scan voltage pulse, a line on which sub-field information should be written in the PDP 10.

With such a construction of the display control circuit 9, field information is read from the frame memories 83A and 83B to the PDP 10 in the following way. To read field information of one frame which has been divided and written in the frame memories 83A and 83B, data corresponding to the first half frame and data corresponding to the latter half frame are simultaneously read. Which is to say, sub-field information for each pixel is sequentially read from the sub-field memories SFM1, SFM2, . . . , and SFM10, simultaneously in the memory area 83A1 and the memory area 83B1. More specifically, sub-field information for each pixel of the first line stored in the sub-field memory SFM1 is read bit by bit, simultaneously from the memory areas 83A1 and 83B1. After a line designation is made by the line driver 93, a latent image is formed (addressing is performed) on the first line of each of the first and latter halves of the screen. Following this, sub-field information for each pixel of the second line stored in the sub-field memory SFM1 is read bit by bit simultaneously from the memory areas 83A1 and 83B1, and inputted in the address drivers 92A and 92B in the same way as above. Then sub-field information equivalent to one line's worth of pixels, i.e. 640 bits of sub-field information are parallelly outputted from each of the address drivers 92A and 92B to the PDP 10, and addressing is performed. Once such reading (writing) has been completed for the last line of each of the first and latter halves of the frame, discharge pulses equivalent to the luminance weight of sub-field SF1 are applied by the address drivers 92A and 92B, as a result of which pixels are illuminated all at once.

After this, sub-field information concerning the ON/OFF state of sub-field SF2 is read for each line and addressing is performed, in the same way as sub-field SF1. Once this operation has been repeated for each of the remaining sub-fields SF3-SF10, the reading (writing) of one-frame field information ends.

Figure 9:
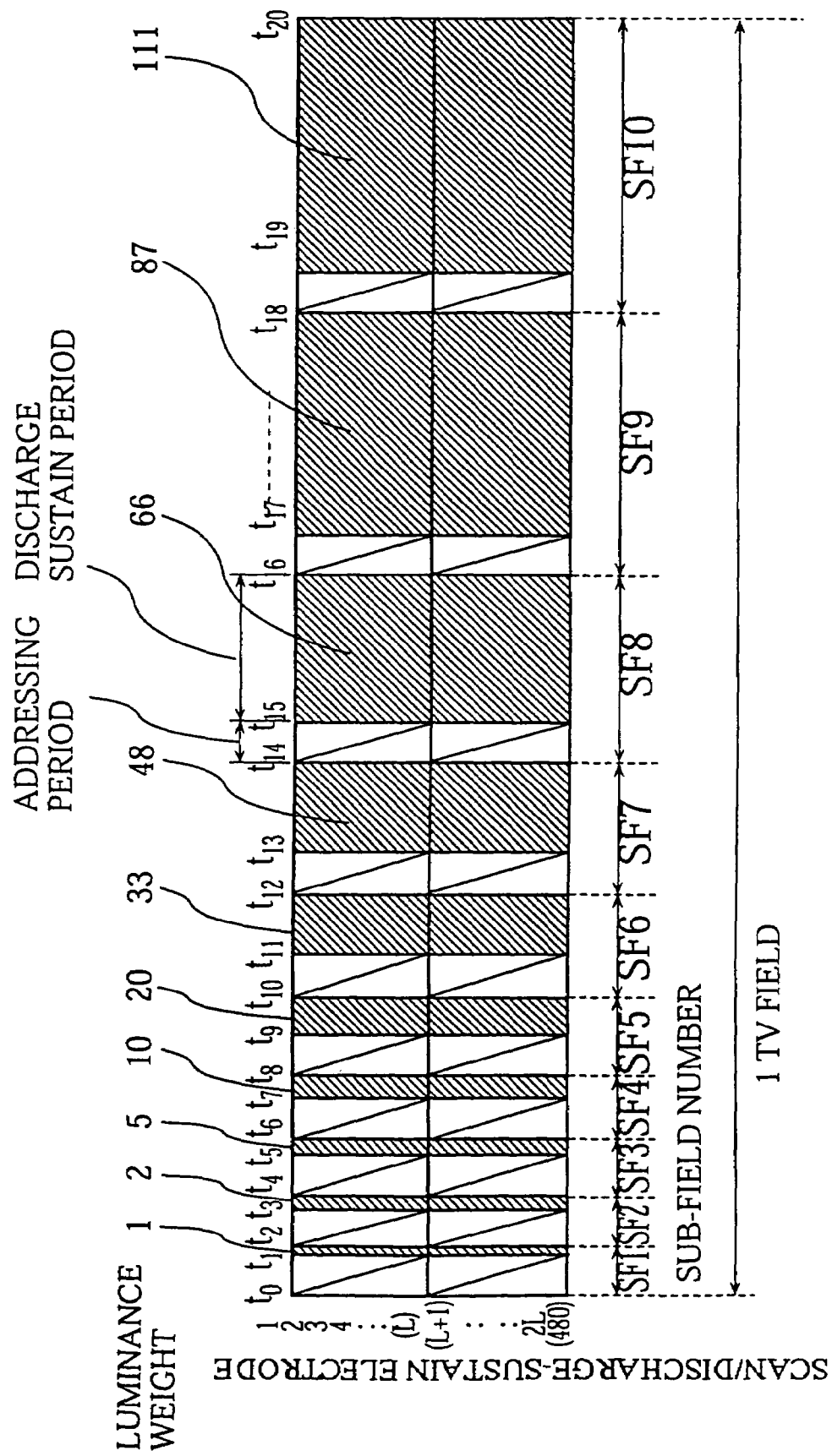
FIG. 9 shows a PDP drive method.

FIG. 9 illustrates the drive method of the PDP 10. In the figure, the horizontal axis indicates time, while the vertical axis indicates the numbers given to scan/discharge-sustain electrodes running across the PDP 10. Each part with a thick slanting line denotes a period during which addressing is performed on pixels to be illuminated, whereas each shaded part denotes a period during which the pixels are illuminated. To be more specific, for horizontal pixels in a scan/discharge-sustain electrode on the first line of each half frame, addressing is performed by applying address pulses to selected address electrodes running in the vertical direction, at the start of sub-field SF1. When the addressing ends for the scan/discharge-sustain electrode on the first line, the same operation is repeated sequentially for the lines that follow. Once addressing has completed for the last scan/discharge-sustain electrode in each half frame, the discharge sustain period t1-t2 starts. During this period, the number of discharge sustain pulses proportional to the luminance weight of sub-field SF1 are applied to discharge-sustain electrodes, where only pixels which have been addressed are illuminated. By repeating such addressing and simultaneous illumination of pixels for each sub-field SF1-SF10, a gray-scale display for one TV field period is completed.

Concurrently with this operation, field information for the first and latter halves of the next frame is read from the other memory areas in the aforedescribed way. In so doing, successive images are displayed.

The addition circuit 3, the differential circuit 11, the group of coefficient circuits 12, and the group of delay circuits 13 are explained next.

The differential circuit 11 calculates a difference between the image signal outputted from the selection circuit 7 and the image signal outputted from the addition circuit 3, and supplies the differential signal to each of the coefficient circuits 12.

The coefficient circuits 12 have the coefficients $7/16$, $1/16$, $5/16$, and $3/16$, respectively.

The delay circuits 13 delay signals outputted from the coefficient circuits 12. Specifically, the delay circuits 13 delay by one pixel (1D), one line (1H)+one pixel (1D), one line (1H), and one line (1H)−one pixel (1D), respectively.

The addition circuit 3 performs addition on the image signal outputted from the inverse gamma correction circuit 2 and the signals outputted from the group of delay circuits 13, and supplies the outcome to the static image coding circuit 4, the moving image coding circuit 5, and the differential circuit 11.

The above addition circuit 3, differential circuit 11, group of coefficient circuits 12, and group of delay circuits 13 form a loop known as "error diffusion loop" that distributes the difference between a gray level which is originally intended and a gray level which is actually displayed, to neighboring pixels.

Effects

By luminance-weighting the sub-fields in the aforementioned way, a heretofore unattainable wide dynamic range is realized while maintaining the same level of resolution in a low gray-level range as conventional PDP-equipped image display apparatuses.

Figure 10:
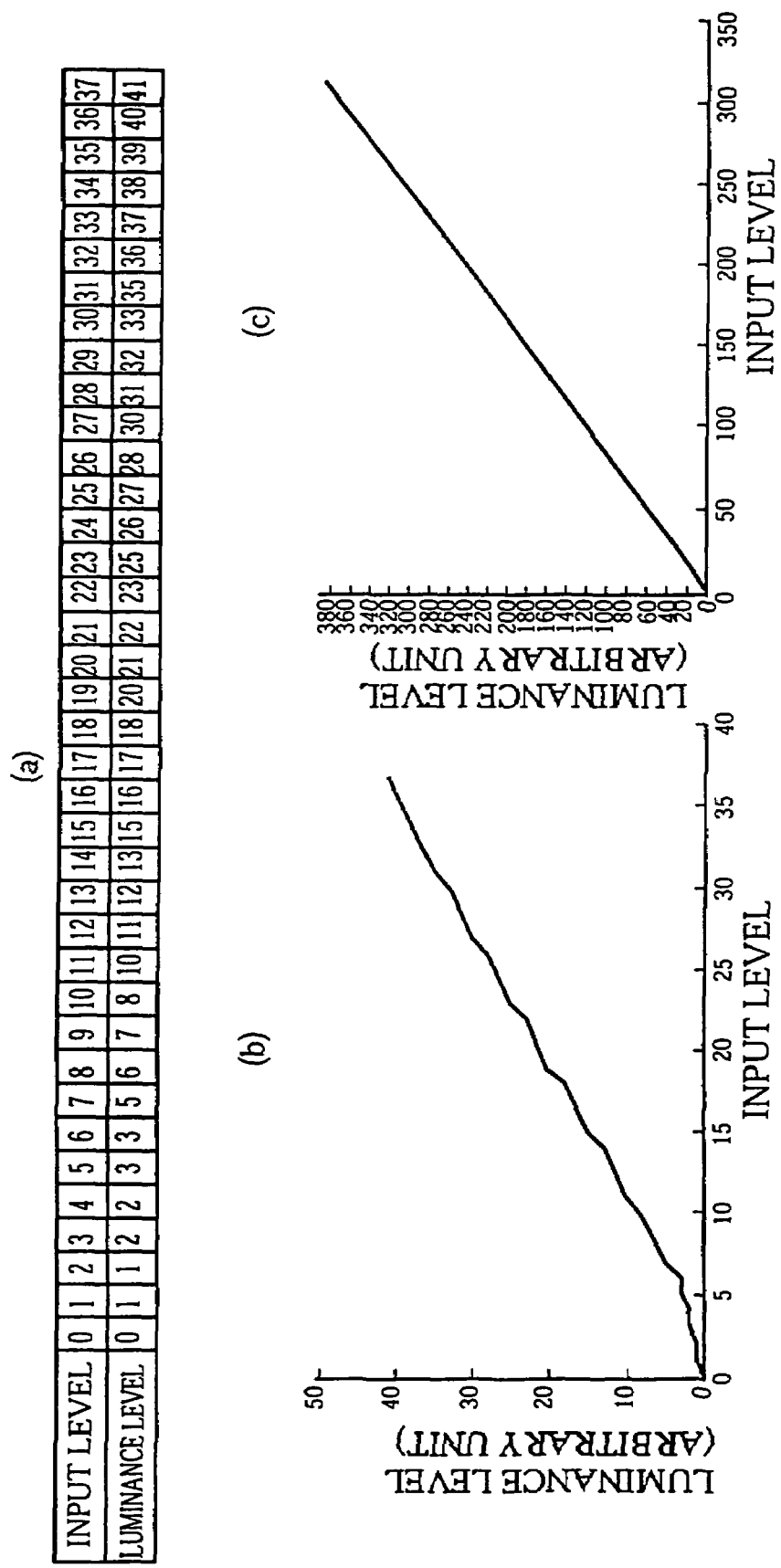
FIGS. 10(a)-10(c) are diagrams showing the correlation between input image signal values and reproduced luminance levels.

FIG. 10 shows the correlation between input image signal values and reproduced luminance levels.

As shown in FIGS. 10(*a*) and 10(*b*), when the input image signal is in the low gray-level range, the reproduced luminance level changes smoothly and gradually with the change in input gray level, in both static and moving images. For example, when the input gray level changes "0", "1", "2", "3", "4", "5", to "6", the reproduced luminance level changes "0", "1", "1", "2", "2", "3", to "3".

Meanwhile, when the input gray level is high such as when light is to be emitted during all sub-fields as shown in FIG. 10(*c*), the maximum luminance level is "1+2+5+10+33+48+66+87+111=383", which is 1.5 times higher than the maximum luminance level "255" which was conventionally common. This enables an image to be displayed in a wide dynamic range.

Such a wide dynamic range is possible for the following reason. If all luminance levels (gray levels) which can be selected in the sub-field control circuit 8 are rearranged in ascending order of luminance level (gray level), it can be seen that the luminance level jumps by one or more levels at certain points (e.g. when the input gray level is "4", "9", or "14"). This makes it possible to increase the ratio between minimum to maximum luminance reproducible on the same screen, in comparison with the conventional techniques.

Here, to cause the luminance level to jump, it is of particular importance to luminance-weight the sub-fields appropriately. That is, the sub-fields should be weighted so that a predetermined luminance weight (e.g. the luminance weight "2" of sub-field SF2) is smaller than one-half of the next luminance weight in ascending order (e.g. the luminance weight "5" of sub-field SF3).

Put another way, when the sub-fields are arranged in ascending order of luminance weight with the "i"th smallest luminance weight being denoted by $W_i$, then the luminance weights need to be assigned so that "n" exists where $W_1+W_1+W_2+\ldots+W_n<W_{n+1}$. In the foregoing example, n=2.

To further widen the dynamic range, it is necessary to make the luminance level jump by greater amounts. Which is to say, when the sub-fields are arranged in ascending order of luminance weight with the "j"th smallest luminance weight being denoted by $W_j$, the luminance weights need to be assigned so that "n" and at least two "i"s exist where $W_j+W_1+W_2+\ldots+W_n<W_{n+1}$. In so doing, a wider dynamic range can be obtained.

In the case of moving images, only part of the gray levels used when displaying static images is employed, as noted earlier. As examples, the input image signal values "40" and "50" are respectively converted into the image signal values "30" and "60", as indicated by the shaded areas 52 in FIG. 3.

What if such specific conversions are not conducted. In that case, when the input image signal is "40", the three sub-fields with the luminance weights "2", "5", and "33" are switched to the ON state, whereas the sub-field with the luminance weight "20", which is ON when the input image signal is "30", is switched to the OFF state.

This disturbs the correlation between the input gray level and the light-emission pattern, thereby increasing the likelihood of false contours in a moving image display.

However, in the image display apparatus of this embodiment, the input image signal value "40" is converted to the image signal value "30" in moving image coding. As is clear from this example, the embodied image display apparatus is constructed so as to switch no sub-field from the ON to the OFF state or switch only sub-fields with relatively small luminance weights from the ON to the OFF state, when the input gray level rises. Hence the image display apparatus can display a moving image without significant false contours.

As described above, the static image coding circuit 4 and the moving image coding circuit 5 perform such coding that particular input image signal values are converted to values different with the original gray levels. This may result in an improper image display, as there is a significant difference between the intended gray level and the gray level actually displayed on the PDP 10.

To solve this problem, the error diffusion loop made up of the addition circuit 3, the differential circuit 11, the group of coefficient circuits 12, and the group of delay circuits 13 is adopted to distribute the difference between the intended gray level and the actual gray level to neighboring pixels.

As a result, the jumps in luminance level transitions are compensated, and an excellent gray-scale image display is accomplished.

It is to be noted that the number of sub-fields and the luminance weights of the sub-fields in the above embodiment are only presented by way of example, and should not be limited to such. If it is possible to increase the number of sub-fields, sub-fields having smaller luminance weights may be added to improve the resolution in the low gray-level range, or sub-fields having larger luminance weights may be added to improve the maximum luminance.

Second Embodiment

Figure 11:
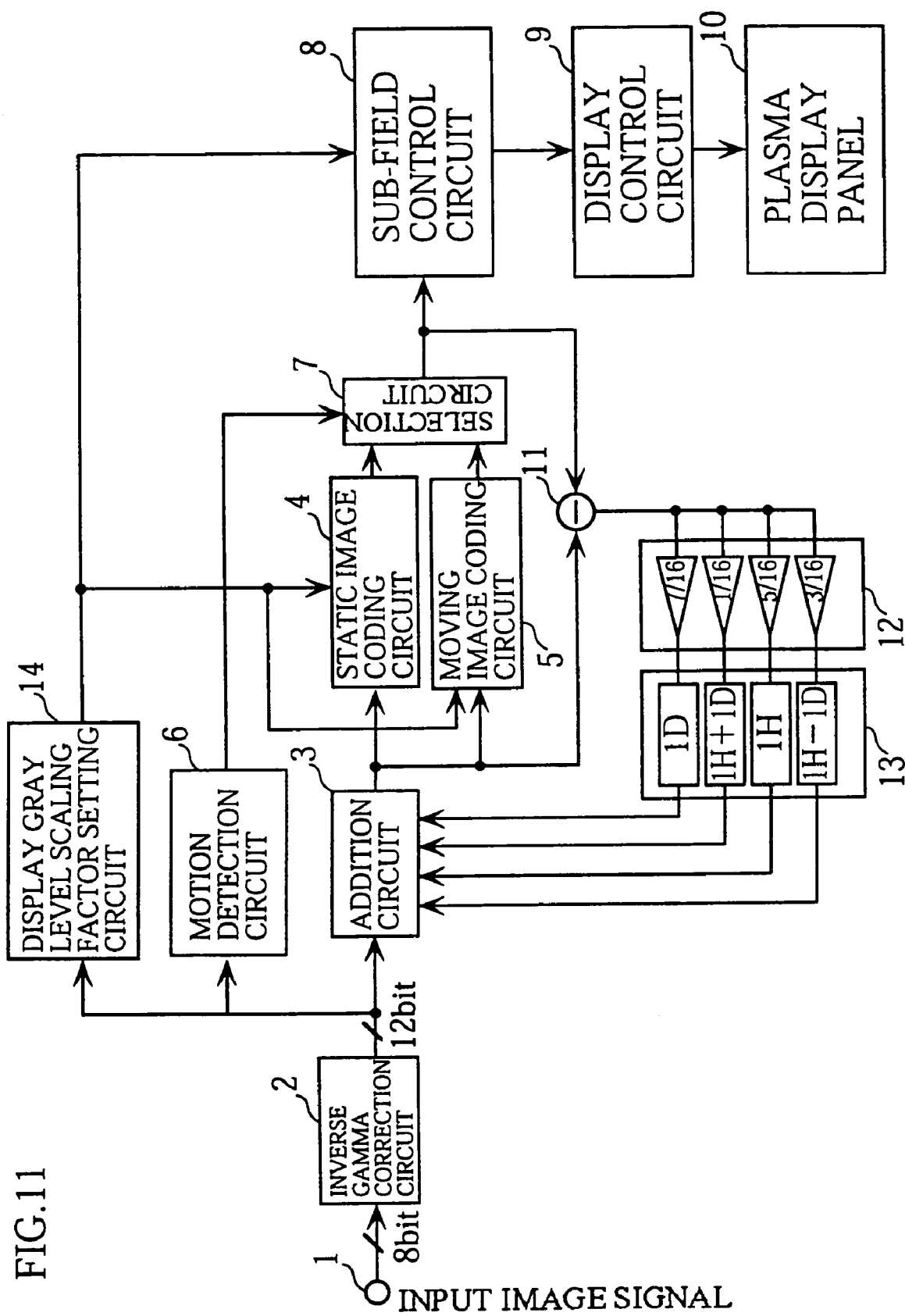
FIG. 11 is a block diagram showing a construction of an image display apparatus according to the second embodiment of the invention.

FIG. 11 is a block diagram showing a construction of an image display apparatus according to the second embodiment of the invention.

As shown in the figure, this image display apparatus has the construction of the image display apparatus of the first embodiment, and additionally includes a display gray level scaling factor setting circuit 14. The difference with the first embodiment lies in that coding in each of the static image coding circuit 4, the moving image coding circuit 5, and the sub-field control circuit 8 is changed in accordance with a maximum gray level of input image signals in a current frame. The following explanation focuses on this difference. Here, for the sake of simplicity, it is assumed that each input image signal is within a range of approximately "22" to "110" in gray level.

The display gray level scaling factor setting circuit 14 calculates a scaling factor of a maximum gray level of the current one-frame image (one-TV-field image) with respect to a reference gray level (e.g. the gray level "22") (the scaling factor, hereafter denoted by K, corresponds to "a ratio of the sum of luminance weights of all sub-fields in the current TV field period to a sum of luminance weights of all sub-fields in the reference TV field period" described in the Claims). The display gray level scaling factor setting circuit 14 then supplies the value K to the static image coding circuit 4, the moving image coding circuit 5, and the sub-field control circuit 8.

The static image coding circuit 4, the moving image coding circuit 5, and the sub-field control circuit 8 perform predetermined coding based on the value K.

The static image coding circuit 4 performs predetermined coding that differs in each of the cases where K=1, K=2, K=3, K=4, and K=5. Here, except when K=1, the static image coding circuit 4 executes such coding that will jump by one or more gray levels (luminance levels). This coding is carried out with reference to a plurality of look-up tables (similar to that in FIG. 2) which show the correspondence between input image signal values and converted (coded) gray levels for the respective values of K. When K=2, K=3, K=4, or K=5, changes in gray level (luminance level) are not consecutive but particular gray levels (luminance levels) are skipped, as can be seen in the leftmost columns of FIGS. 14(*b*)-14(*e*).

The moving image coding circuit 5 performs predetermined coding that differs in each of the cases where K=1, K=2, K=3, K=4, and K=5. Here, except when K=1, the moving image coding circuit 5 executes such coding that will jump by one or more gray levels (luminance levels). Also, the moving image coding circuit 5 limits coding to specific gray levels (each image signal value marked with an asterisk on the left of each of FIGS. 14(*a*)-14(*e*) is unused. Likewise, each image signal value marked with an asterisk on the left of FIG. 26(*a*) is unused). Such coding is carried out with reference to a plurality of look-up tables (similar to that in FIG. 3) which show the correspondence between input image signal values and converted (coded) gray levels for the respective values of K.

The sub-field control circuit 8 converts an image signal corresponding to each pixel into field information of, in this embodiment, 5 bits having predetermined luminance weights, with reference to coding tables (look-up tables) associated respectively with the cases where K=1, K=2, K=3, K=4, and K=5.

Figure 12:
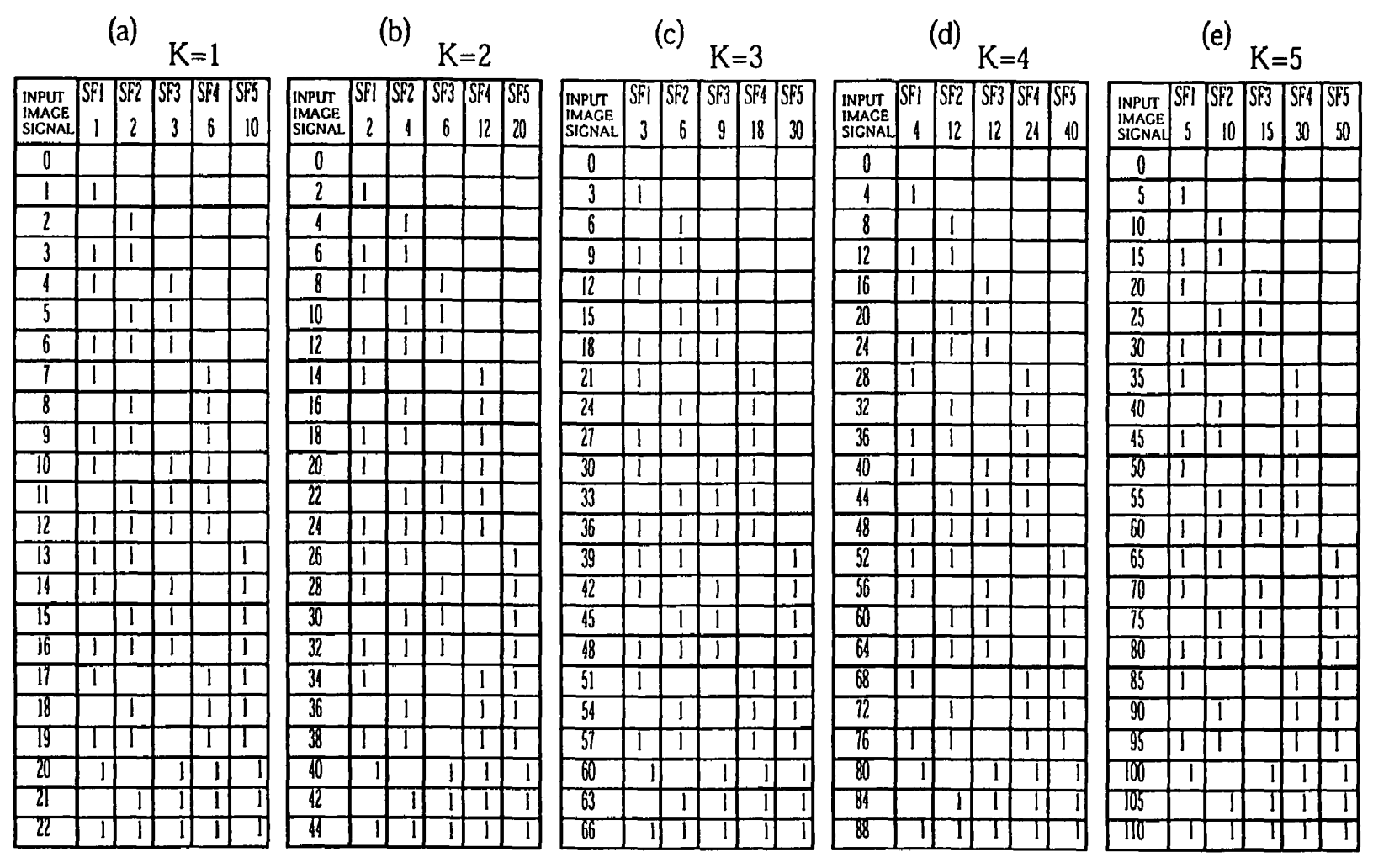
Figure 13:
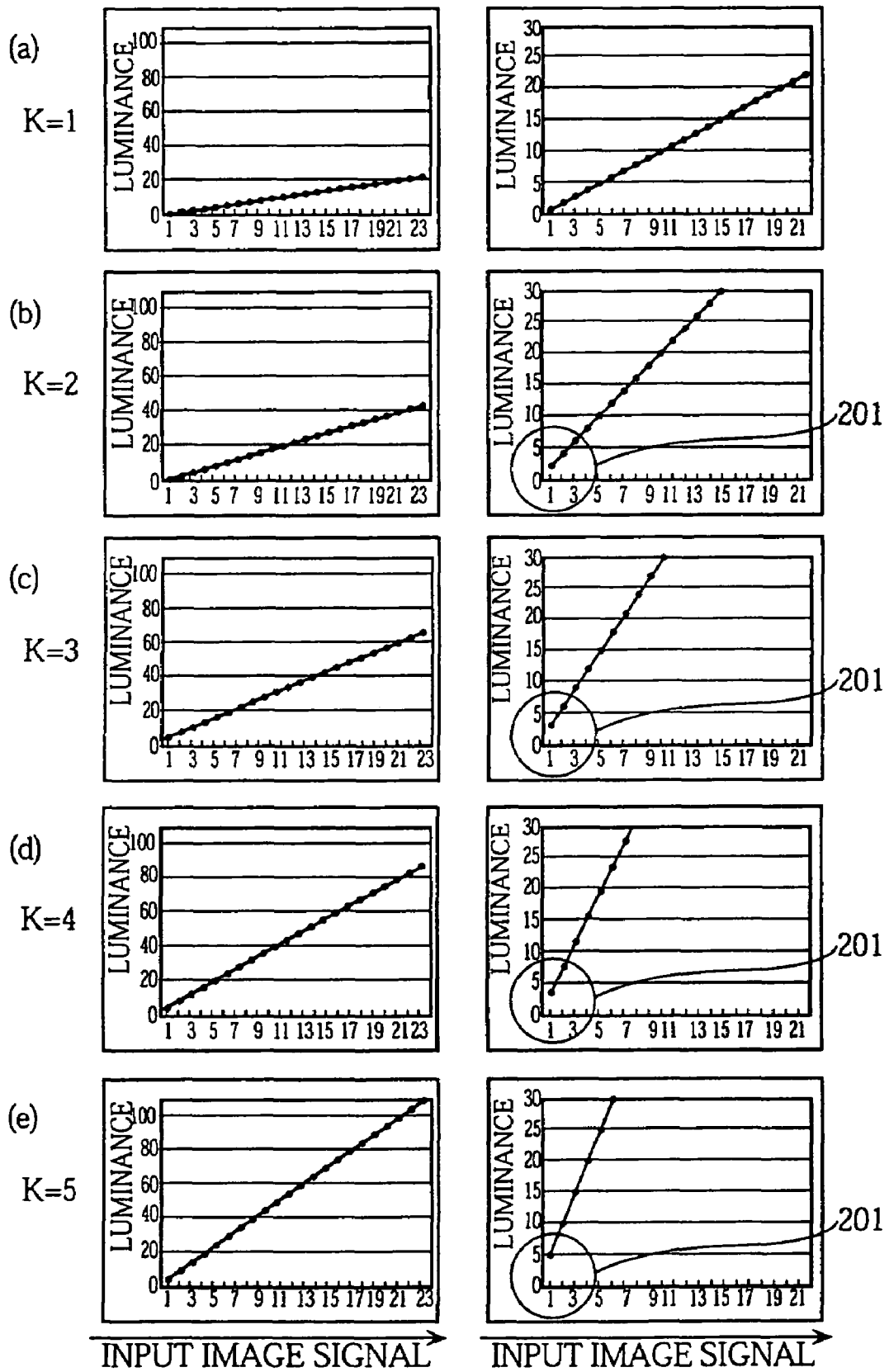
FIGS. 13(a)-13(e) are characteristic diagrams showing the correlation between input image signal values and reproduced luminance levels (prior art)
Figure 15:
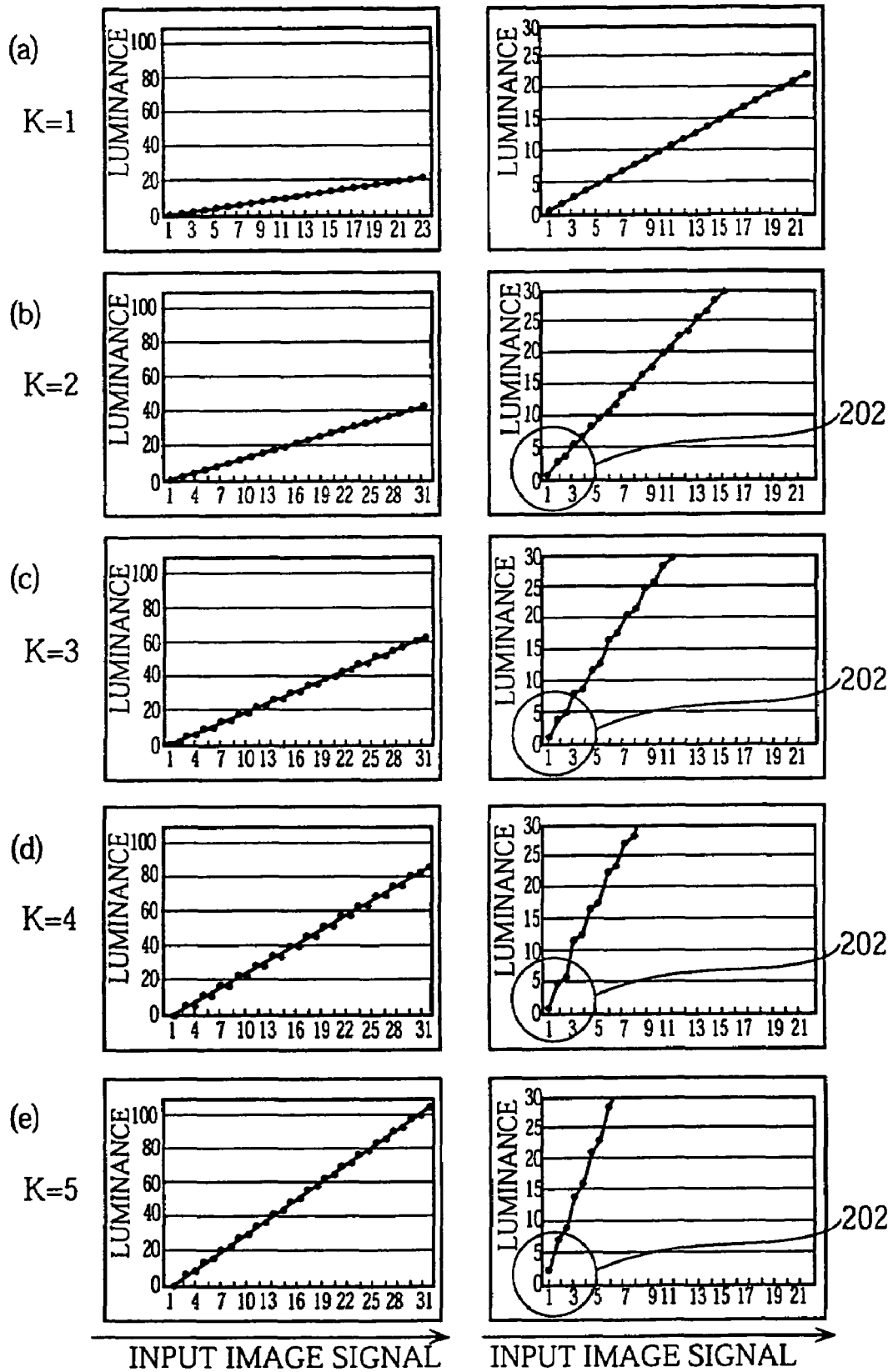
FIGS. 15(a)-15(e) are characteristic diagrams showing the correlation between input image signal values and reproduced luminance levels (present invention)

Conventionally, when switching between different coding patterns in the sub-field control circuit 8 based on the value of K, luminance weights in a reference coding pattern (in FIG. 12, a coding pattern in FIG. 12(*a*) where sub-field luminance weights are "1, 2, 3, 6, 10" in order of time) are each multiplied by K to set luminance weights of a coding pattern corresponding to K, and each pixel within the current frame is displayed using the set coding pattern, as shown in FIGS. 12(*a*) to 12(*e*). However, though this method can increase a maximum luminance level, it cannot widen a dynamic range of reproduced luminance levels. As is apparent from FIGS. 13(*a*)-13(*e*) concerning the correlation between input image signal values and reproduced luminance levels, the reproduced luminance becomes higher as K increases, when the input image signal is in the low gray-level range (designated by the circles 201). This causes a decrease in resolution in the low gray-level range and makes it impossible to widen the dynamic range. Note here that the drawings on the right side of FIG. 13 are magnified views of the respective left-side drawings, where the corresponding drawings show the same contents (the same applies to FIG. 15).

Figure 14:
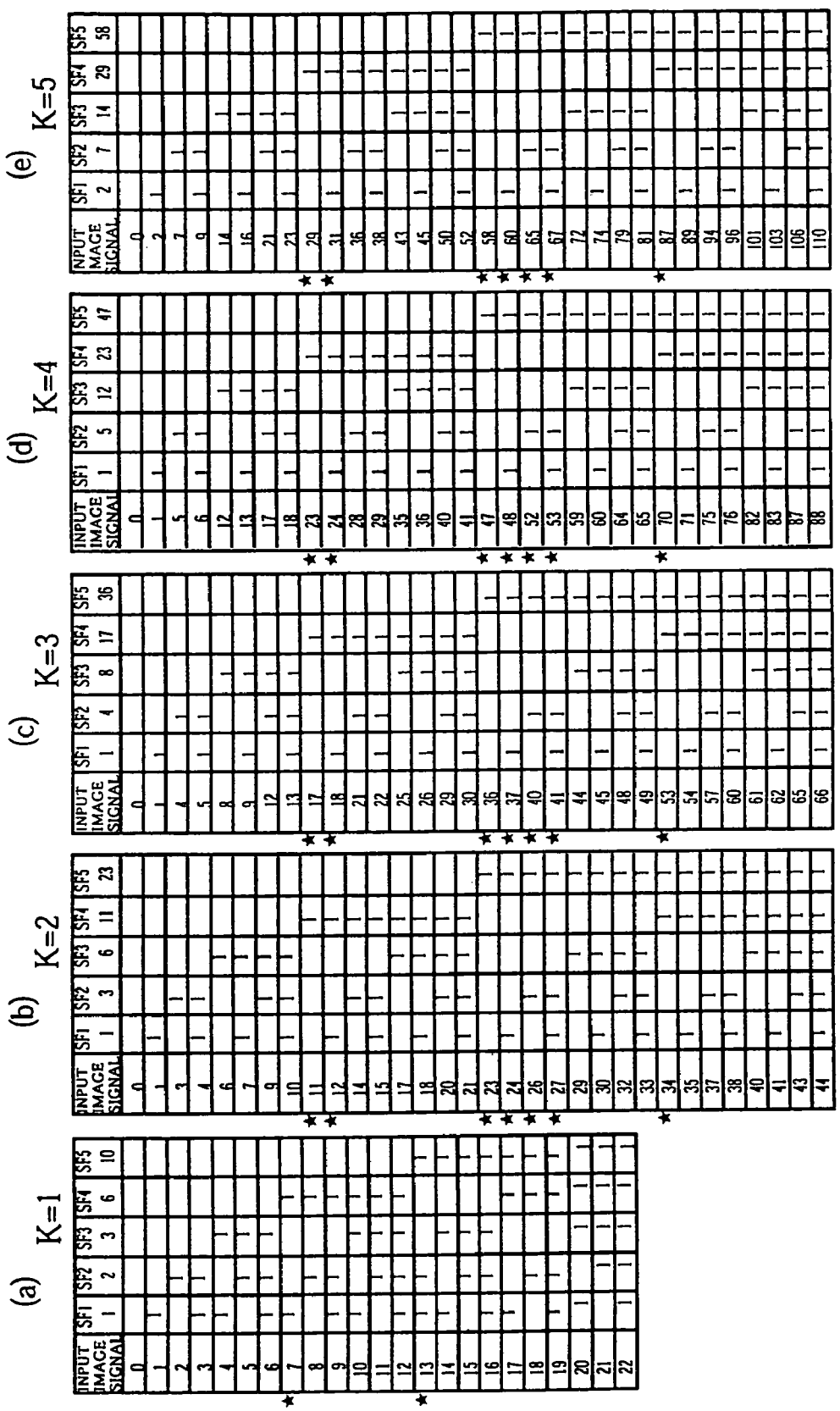
FIGS. 14(a)-14(e) are diagrams showing a process of switching coding patterns based on a value of K in the sub-field control circuit (present invention)

In the image display apparatus of the present embodiment, on the other hand, luminance weights in a reference coding pattern (in FIG. 14, a coding pattern in FIG. 14(*a*) where sub-field luminance weights are "1, 2, 3, 6, 10" in order of time) are multiplied by different coefficients. That is, smaller luminance weights are respectively multiplied by values no greater than K, whereas larger luminance weights are respectively multiplied by values greater than K, to set luminance weights of a coding pattern corresponding to K. Each pixel within the current frame is displayed using the set coding pattern.

Here, the coefficients for multiplying the luminance weights of the reference coding pattern may be coefficients that monotonously increase in ascending order of luminance weight.

Alternatively, the coefficients for multiplying the luminance weights of the reference coding pattern may be coefficients that increase in arithmetic progression in ascending order of luminance weight.

Alternatively, the coefficients for multiplying the luminance weights of the reference coding pattern may be coefficients that increase in geometric progression in ascending order of luminance weight.

Among these, the use of geometrically increasing coefficients is particularly effective for a wider dynamic range.

For instance, the coefficients for multiplying the luminance weights "1, 2, 3, 6, 10" are:

"1, 1.5, 2, 1.83, 2.3" when K=2;
"1, 2, 2.67, 2.83, 3.6" when K=3;
"1, 2.5, 4, 3.83, 4.7" when K=4; and
"2, 3.5, 4.67, 4.83, 5.8" when K=5.

Here, when K=2 or K=3, a group of sub-fields whose luminance weights are multiplied by values no greater than K includes a sub-field with a luminance weight multiplied by the smallest possible value of K (i.e. the coefficient "1"). In doing so, the increase of the luminance level against the input is suppressed in the low gray-level range. Meanwhile, the larger the value of K, the larger coefficients are generally used to multiply the luminance weights of the reference coding pattern, in order to increase the maximum luminance level.

Thus, an image is displayed through the use of a coding pattern that is composed of a group of sub-fields having luminance weights multiplied by coefficients no greater than K and a group of sub-fields having luminance weights multiplied by coefficients greater than K.

By setting the luminance weights in such a manner, not only can the maximum luminance be increased, but the dynamic range of reproduced luminance levels can be widened. This is clear from FIGS. 15(*a*)-15(*e*) that show the correlation between input image signal values and reproduced luminance levels. The luminance level is kept low against the input in the low gray-level range (shown by the circles 202), with it being possible to maintain the resolution in the low gray-level range and at the same time widen the dynamic range.

To further widen the dynamic range as the value of K rises, it is necessary to make the luminance level jump by greater amounts. To do so, the ratios between the coefficients for multiplying larger luminance weights and the coefficients for multiplying smaller luminance weights are set to be greater for a larger K. Which is to say, when the sub-fields are arranged in ascending order of luminance weight with the "j"th smallest luminance weight being denoted by $W_j$, a TV field period with a large K may be preferably given such luminance weights that "n" and at least two "i"s exist where $W_i + W_1 + W_2 + \ldots + W_n < W_{n+1}$.

Take the aforementioned luminance weights when K=4 as an example. When $W_1=1$, $W_2=5$, $W_3=12$, $W_4=23$, and $W_5=47$, then n=4 and i=2 exist such that $W_2 + W_1 + W_2 + \ldots + W_4 (=46) < W_{4+1} (=47)$.

Thus, by making the luminance level jumps more sharply for a TV field period having a large K, the dynamic range can be effectively widened.

Note here that coding patterns are not limited to the above presented patterns. As long as each of at least two coding patterns includes at least two approximate luminance weight proportions out of "1:2:3", "1:2:4", "1:2:5", "1:2:6", "1:3:7", "1:4:9", "2:6:12", and "2:6:16", it is possible to make the luminance level jump, as a result of which the dynamic range is widened.

Moreover, by using the error diffusion loop of the first embodiment to distribute the difference between the intended gray level and the actual gray level to neighboring pixels, the jumps in luminance level transitions are compensated, and an excellent gray-scale image display is accomplished.

Third Embodiment

Figure 16:
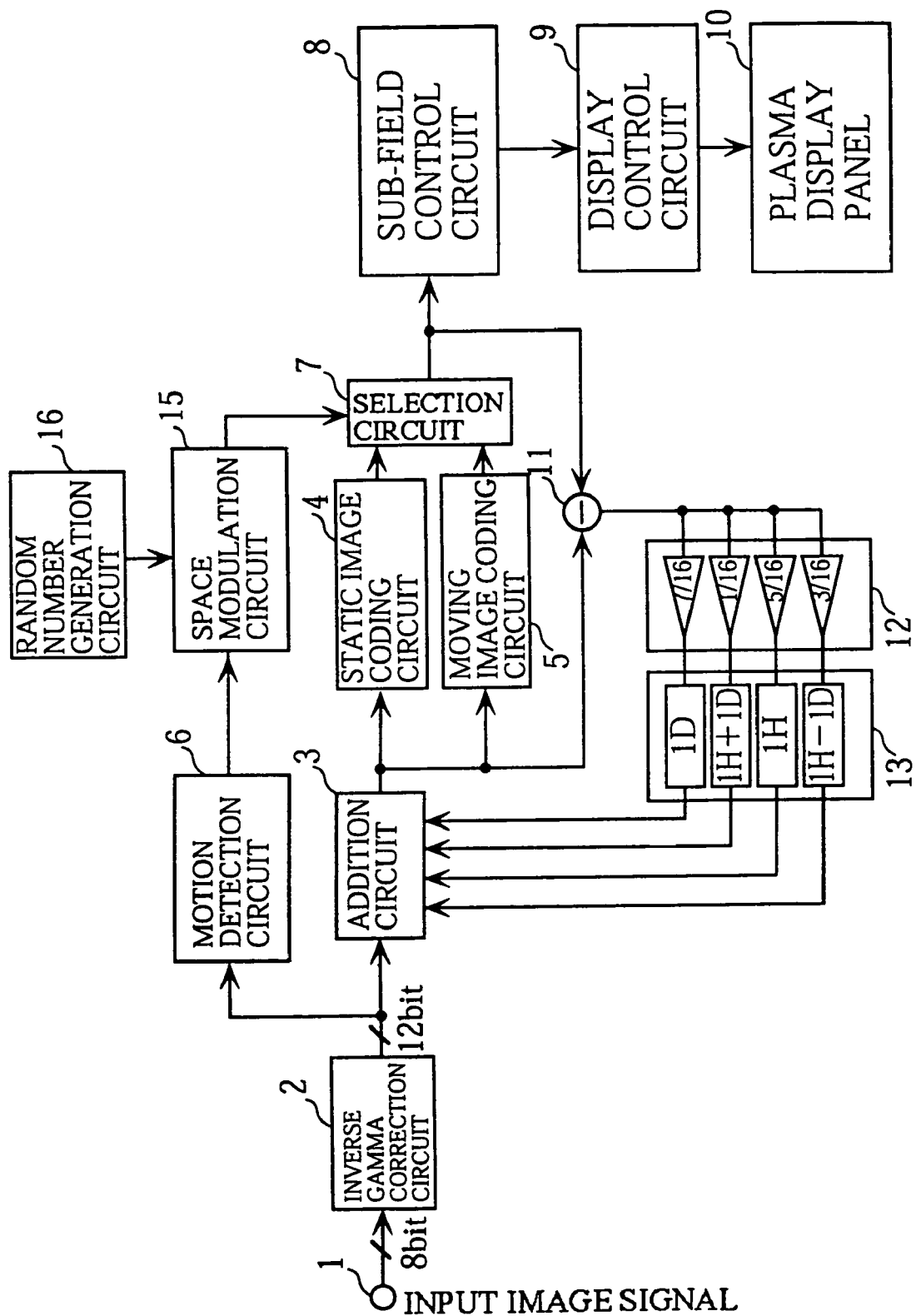
FIG. 16 is a block diagram showing a construction of an image display apparatus according to the third embodiment of the invention.

FIG. 16 is a block diagram showing a construction of an image display apparatus according to the third embodiment of the invention.

In the figure, the image display apparatus has the construction of the image display apparatus of the first embodiment, and additionally includes a space modulation circuit 15 for performing space modulation on a motion detection signal outputted from the motion detection circuit 6, and a random number generation circuit 16 for supplying a random number to the space modulation circuit 15. The following explanation focuses on the differences with the first embodiment.

Figure 17:
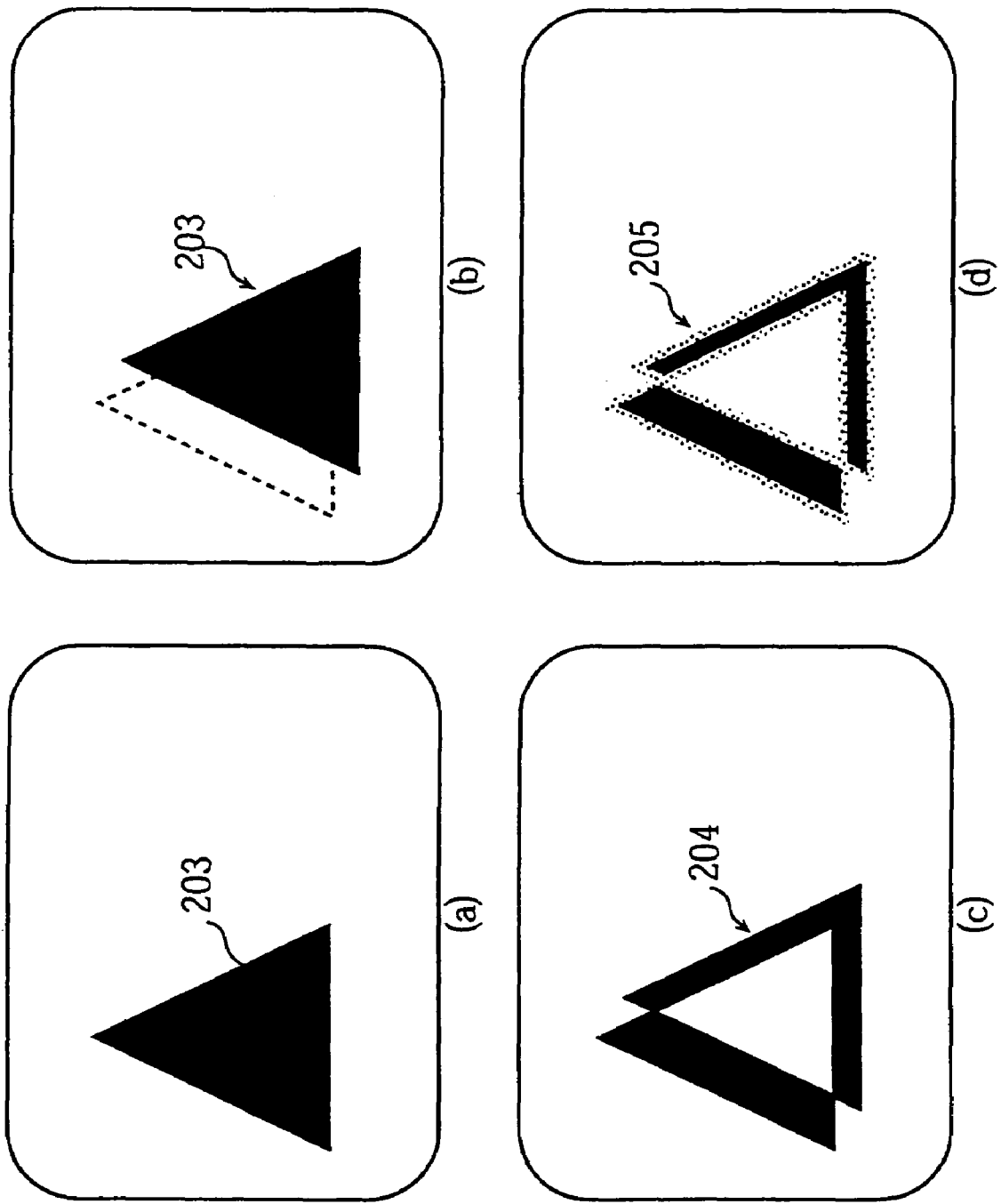
FIG. 17 shows, by way of example, an input image and a motion detection result.

FIG. 17 shows, by way of example, an input image and a motion detection result in this embodiment.

When a triangular object 203 in FIG. 17(a) moves rightward as shown in FIG. 17(b), a solidly shaded area 204 in FIG. 17(c) is detected as a motion area which is represented by a motion detection signal, from the current and past TV field periods.

The random number generation circuit 16 generates one of the random numbers such as "−3" to "3", and supplies the random number to the space modulation circuit 15. The space modulation circuit 15 shifts the pixel positions of the motion area shown in FIG. 17(c) in a horizontal or vertical direction by the number of pixels corresponding to the random number, and thereby obtains a signal representative of a solidly shaded area 205 in FIG. 17(d). The space modulation circuit 15 supplies the obtained signal to the selection circuit 7 as a switching signal.

Conventionally, coding is changed between a static area and a motion area using the motion detection signal shown in FIG. 17(c) as a switching signal. However, if the shape of the boundary of the motion area represented by the switching signal is linear, the light emission pattern accompanying the switching tends to get linear, thereby inducing a significant impact on the boundary of the motion area.

On the other hand, when the signal shown in FIG. 17(d) is used as a switching signal, the boundary of the motion area represented by the switching signal assumes a random shape. Accordingly, if such a signal is used to switch between the static image coding mode and the moving image coding mode, these different coding modes will end up being interspersed in the boundary area. As a result, the switching between the two coding modes will no longer cause a linear transition in time characteristic of light emission in the PDP 10. This makes the impact of the switching less significant, with it being possible to switch between static image coding and moving image coding more smoothly.

The above effects can be attained as long as the shape of the boundary of the motion area represented by the switching signal is not linear. Therefore, though the pixel positions are shifted randomly in the above embodiment, they may instead be shifted regularly. Also, the same effects can be achieved when the boundary of the motion area has a shape that contains a zigzag as a main component which turns no more than once in a pixel.

Fourth Embodiment

Figure 18:
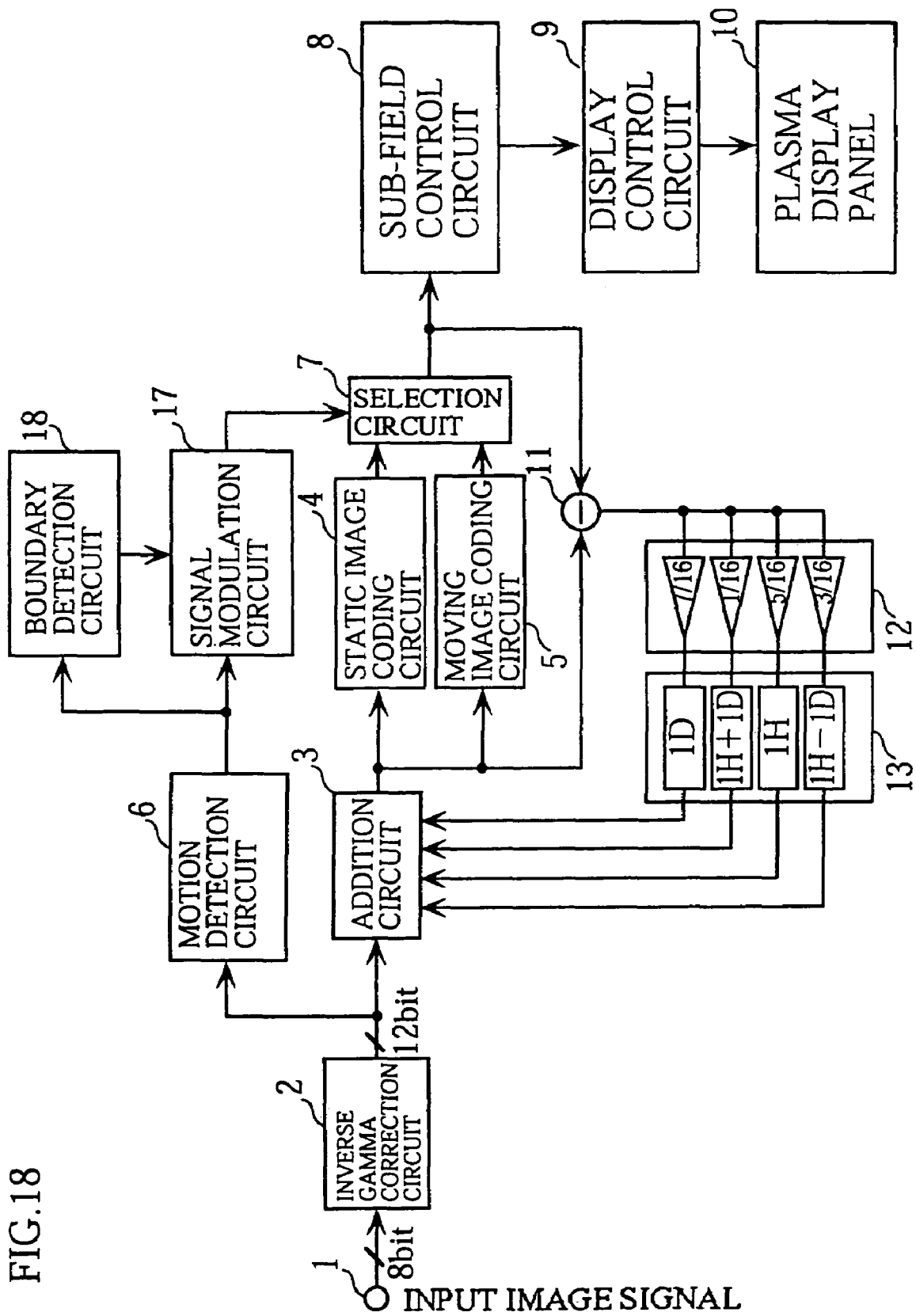
FIG. 18 is a block diagram showing a construction of an image display apparatus according to the fourth embodiment of the invention.

FIG. 18 is a block diagram showing a construction of an image display apparatus according to the fourth embodiment of the invention.

In the figure, the image display apparatus has the construction of the image display apparatus of the first embodiment, and additionally includes a signal modulation circuit 17 for performing amplitude modulation on a motion detection signal outputted from the motion detection circuit 6, and a boundary detection circuit 18 for supplying a signal representative of a boundary of motion and static areas, to the signal modulation circuit 17. The following explanation focuses on the differences with the first embodiment.

Figure 19:
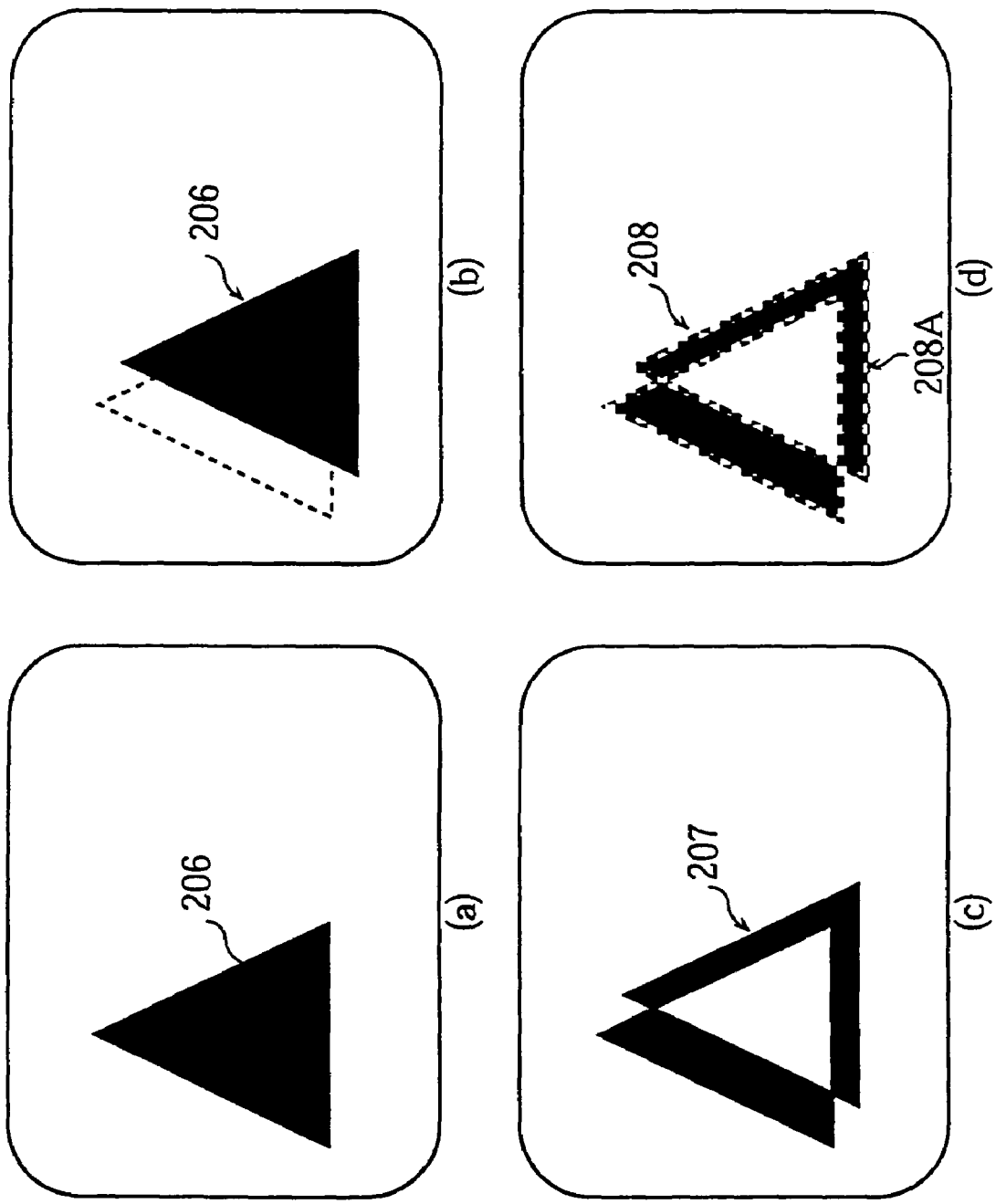
FIG. 19 shows, by way of example, an input image and a motion detection result.

FIG. 19 shows, by way of example, an input image and a motion detection result in this embodiment.

When a triangular object 206 in FIG. 19(a) moves rightward as shown in FIG. 19(b), a solidly shaded area 207 in FIG. 19(c) is detected as a motion area which is represented by a motion detection signal, from the current and past TV field periods.

The boundary detection circuit 18 detects the boundary of the motion area where the value of the motion detection signal changes. Based on the signal representative of this boundary area, the signal modulation circuit 17 performs amplitude modulation on the motion detection signal in the boundary of the motion area, and thereby obtains a switching signal that represents a solidly shaded area 208 having edges 208A in FIG. 19(d). The signal modulation circuit 17 supplies the switching signal to the selection circuit 7. Note that in FIG. 19(d) the modulated portion of the signal has a pattern where adjacent pixels alternate between two states.

When such a switching signal that has been modulated in the boundary of the motion and static areas is used, the boundary area assumes a random shape as in the third embodiment, so that the different coding modes for static and moving images will end up being interspersed in the boundary area. Accordingly, if this signal is used to switch between static image coding and moving image coding, the switching will no longer cause a linear transition in time characteristic of light emission in the PDP 10, as a result of which the impact of the switching becomes less significant. Hence the switching between static image coding and moving image coding can be done smoothly.

In addition, by modulating the motion detection signal in the boundary of the motion area, the impact of the switching between moving image coding and static image coding is reduced, while coding modes for image areas other than the boundary of the motion area are fixed. Hence unnecessary switching between the two coding modes is avoided, and an image can be displayed with no decrease in signal-noise ratio.

Though the modulation of the motion detection signal in the boundary area has a regular pattern in the above embodiment, the same effects can be attained by modulating the motion detection signal using a random number.

Fifth Embodiment

Figure 20:
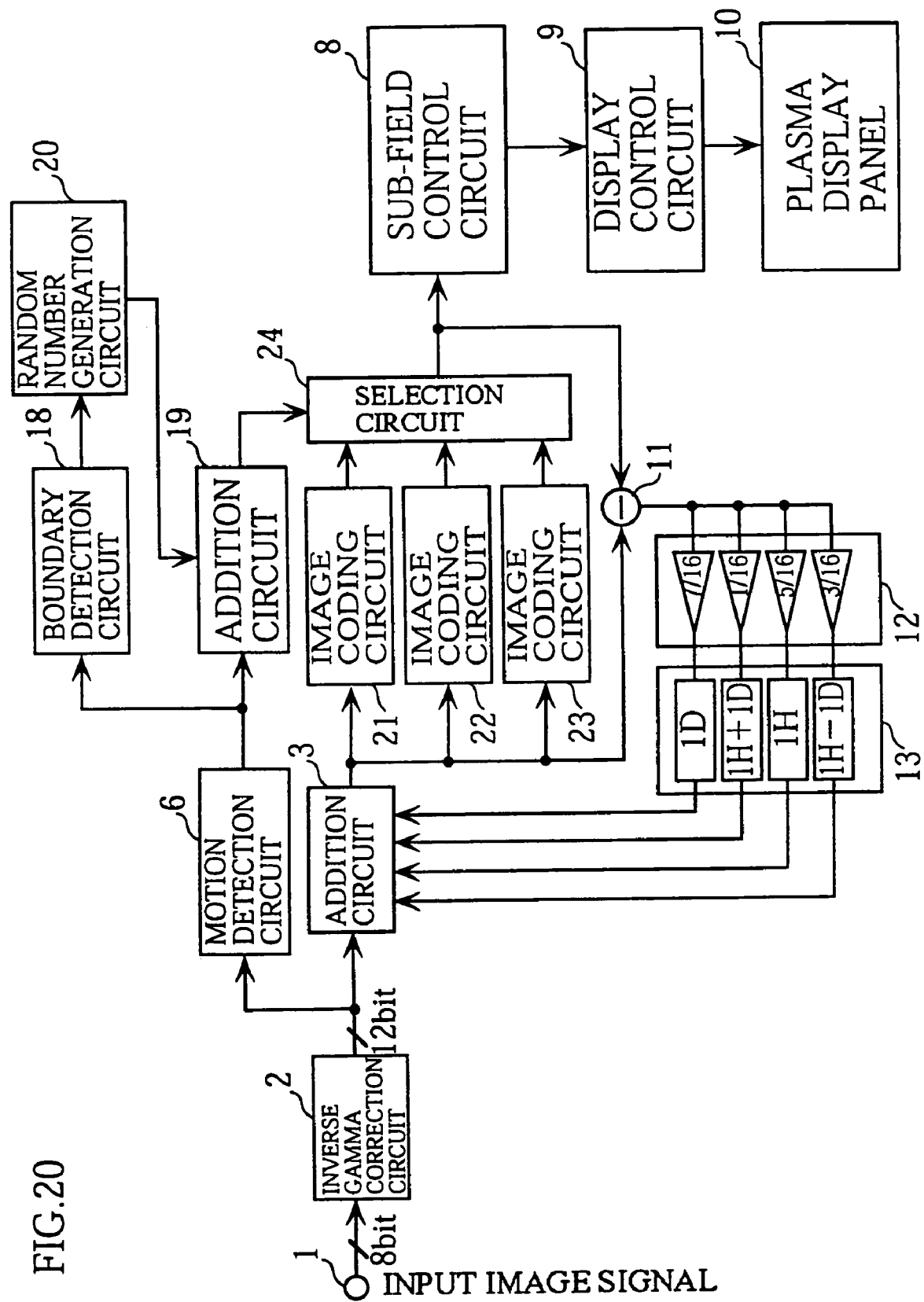
FIG. 20 is a block diagram showing a construction of an image display apparatus according to the fifth embodiment of the invention.

FIG. 20 is a block diagram showing a construction of an image display apparatus according to the fifth embodiment of the invention.

This image display apparatus differs with that in the fourth embodiment in the following points. First, an addition circuit 19 and a random number generation circuit 20 (which generates one of the random numbers "1", "0", and "−1" in this embodiment) are added to form a signal modulation circuit. Second, three image coding circuits 21 to 23 are included instead of the static image coding circuit 4 and the moving image coding circuit 5. Third, a selection circuit 24 having three signal inputs is included instead of the selection circuit 7. Fourth, the motion detection circuit 6 detects movement in an image, by classifying the amount of movement under three levels.

The image coding circuits 21-23 perform coding respectively under three levels shown in FIGS. 21(a)-21(c). More specifically, for a static area, a coding mode shown in FIG. 21(a) is used that attaches importance to gray-level characteristics. For a motion area, coding modes shown in FIGS. 21(b) and 21(c) are used that limit gray levels so as to suppress the occurrence of moving image false contours. Of these, the coding mode of FIG. 21(b) is applied to image areas with intermediate amounts of movement, whereas the coding mode of FIG. 21(c) is applied to image areas with relatively large amounts of movement.

The motion detection circuit 6 detects motion in an image under the three levels corresponding to the three coding modes. The boundary detection circuit 18 detects the boundary of the motion area where the value of the motion detection signal changes. The random number generation circuit 20 generates a random number. The addition circuit 19 adds the random number to the value of the motion detection signal in the boundary area, and supplies the resulting signal to the selection circuit 24 as a switching signal.

With this construction, coding modes for image areas other than the boundary of the motion and static areas are fixed, so that unnecessary switching between static image coding and moving image coding is avoided and an image display with no decrease in signal-noise ratio is produced. Also, intermediate coding is employed for an image area between the static area and the motion area in order to switch between the different coding modes step by step, which allows the switching to be made smoothly. Furthermore, the switching signal is modulated in the boundary of the motion area, so that the impact of the switching is effectively suppressed.

Sixth Embodiment

Figure 22:
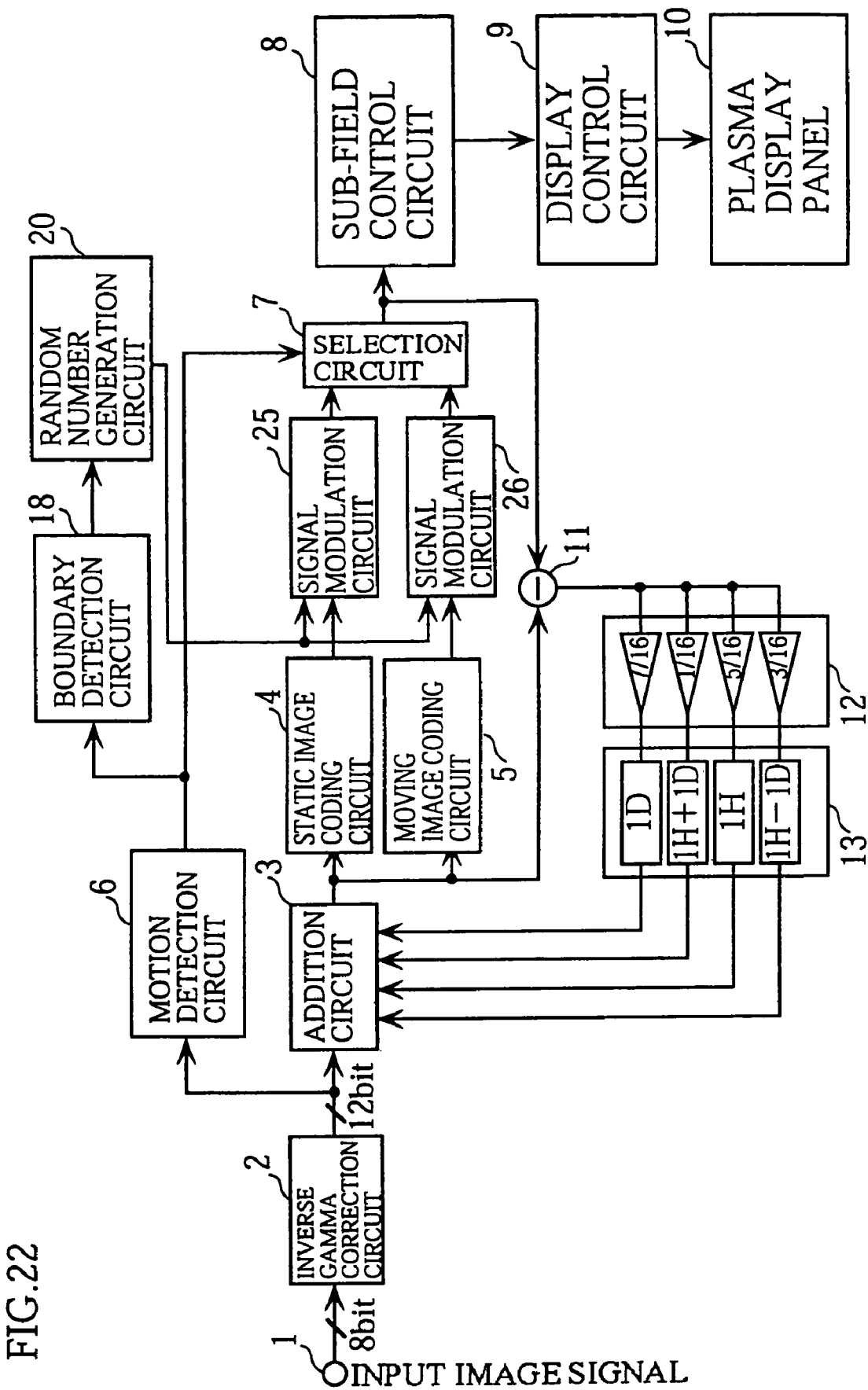
FIG. 22 is a block diagram showing a construction of an image display apparatus according to the sixth embodiment of the invention.

FIG. 22 is a block diagram showing a construction of an image display apparatus according to the sixth embodiment of the invention.

As shown in the figure, this image display apparatus is equipped with the boundary detection circuit 18 and the random number generation circuit 20 (which generates one of the random numbers "0" and "1" in this embodiment). Also, signal modulation circuits 25 and 26 for performing amplitude modulation respectively on signals outputted from the static image coding circuit 4 and the moving image coding circuit 5 are included in place of the signal modulation circuit 17 of the fourth embodiment.

Figure 23:
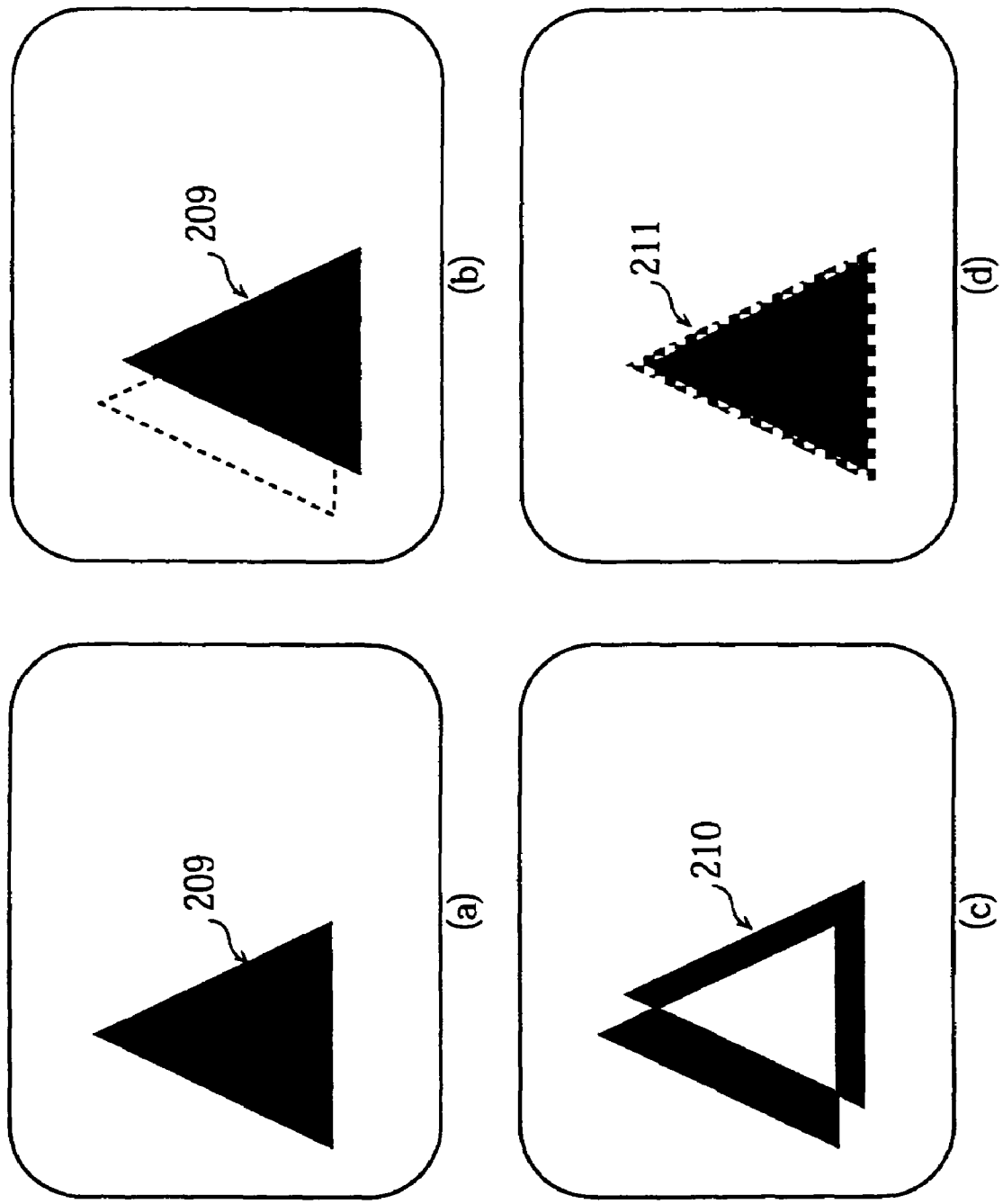
FIG. 23 shows, by way of example, an input image and a motion detection result.

FIG. 23 shows, by way of example, an input image and a motion detection result in this embodiment.

When a triangular object 209 in FIG. 23(a) moves rightward as shown in FIG. 23(b), a solidly shaded area 210 shown in FIG. 23(c) is detected as a motion area which is represented by a motion detection signal, from the current and past TV field periods.

The boundary detection circuit 18 detects the boundary of the motion area where the value of the motion detection signal changes. The random number generation circuit 20 generates a random number, and supplies it to the signal modulation circuits 25 and 26 as an operation switch signal.

The signal modulation circuits 25 and 26 perform amplitude modulation respectively on the image signals outputted from the static image coding circuit 4 and the moving image coding circuit 5. The selection circuit 7 selects one of the image signals outputted from the signal modulation circuits 25 and 26, using the motion detection signal as a switching signal. As a result, an image signal shown by a solidly shaded area 211 in FIG. 23(d) is obtained. Here, the modulated portion of the obtained image signal has a pattern in which adjacent pixels alternate between two states.

When such an image signal which has been modulated in the boundary between the motion and static areas is used, that boundary assumes a random shape, so that the static image coding mode and the moving image coding mode will end up being interspersed in the boundary area. Since the switching between these different coding modes no longer induces a linear change in time characteristic of light emission in the PDP 10, the impact of the switching becomes less significant. Thus, the switching between the two coding modes can be done smoothly.

Furthermore, since the image signal is modulated in the boundary of the motion area, the impact of the switching is reduced, while coding modes for image areas other than the boundary of the motion area are fixed. Accordingly, unnecessary switching between the two coding modes is suppressed, and an image is displayed with no decrease in signal-noise ratio.

Seventh Embodiment

Figure 24:
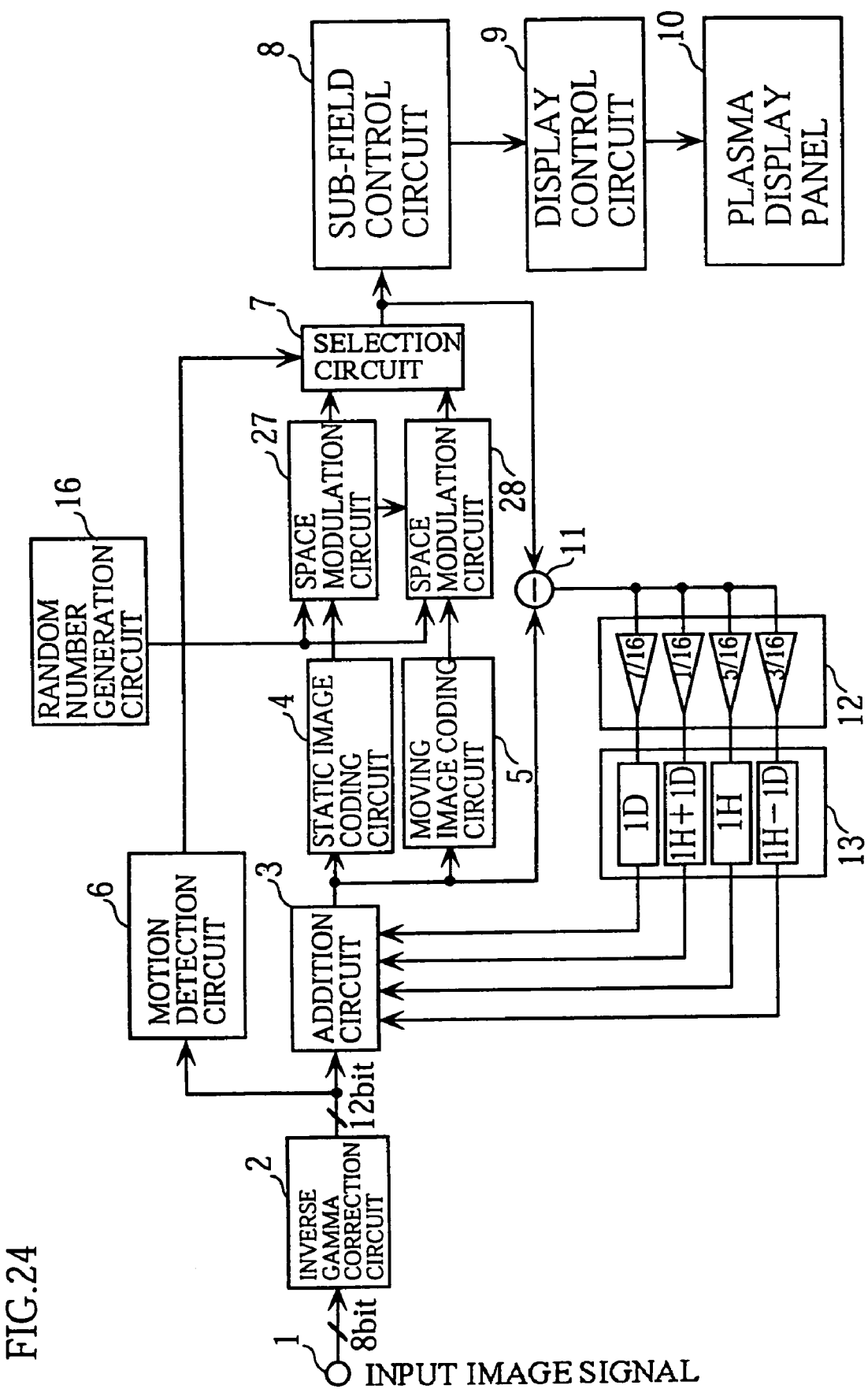
FIG. 24 is a block diagram showing a construction of an image display apparatus according to the seventh embodiment of the invention.

FIG. 24 is a block diagram showing a construction of an image display apparatus according to the seventh embodiment of the invention.

As illustrated, this image display apparatus is equipped with space modulation circuits 27 and 28 for performing space modulation respectively on image signals outputted from the static image coding circuit 4 and the moving image coding circuit 5, instead of the space modulation circuit 15 in the third embodiment. The following explanation focuses on the differences with the third embodiment.

Figure 25:
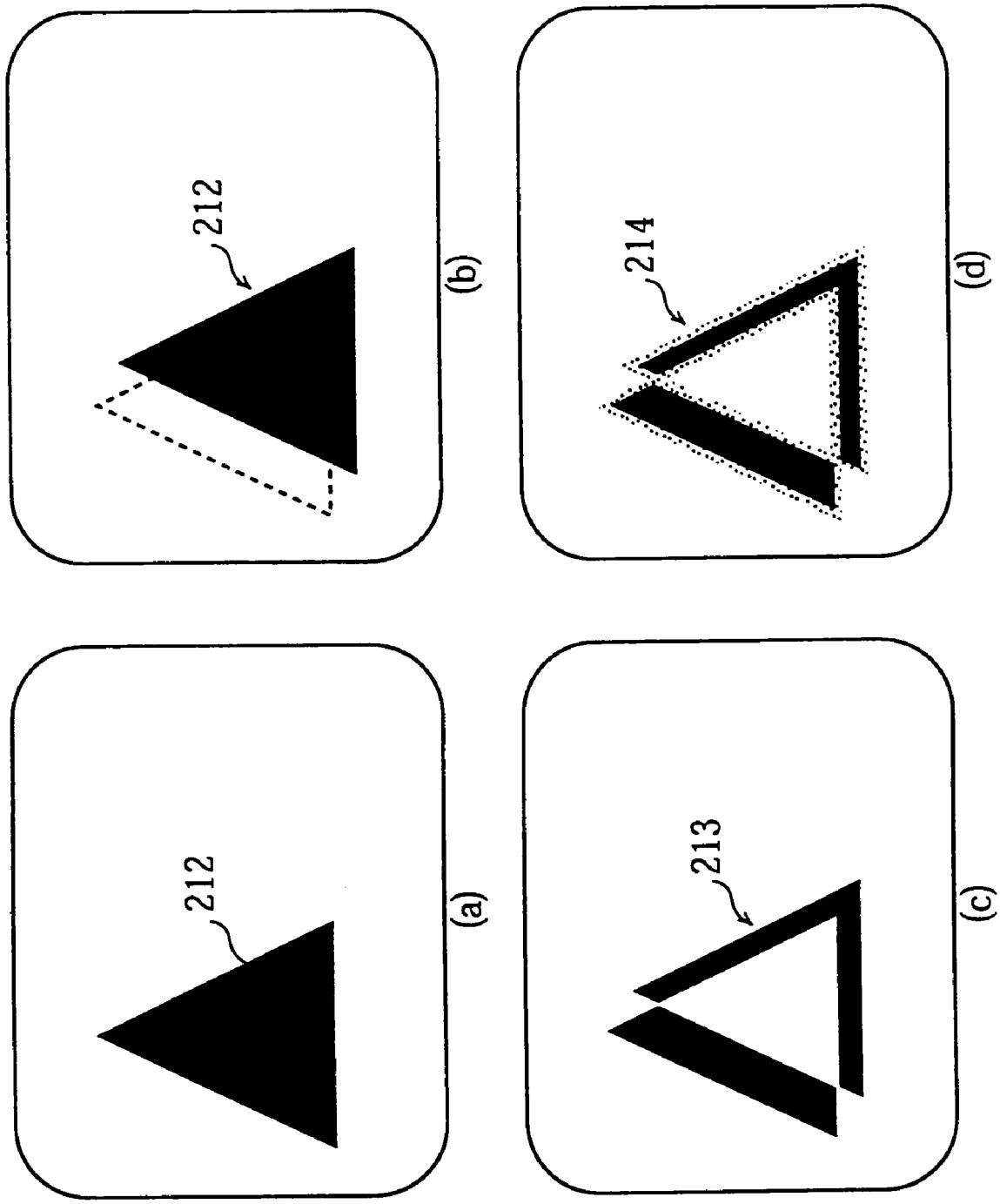
FIG. 25 shows, by way of example, an input image and a motion detection result.

FIG. 25 shows, by way of example, an input image and a motion detection result in this embodiment.

When a triangular object 212 in FIG. 25(a) moves rightward as shown in FIG. 25(b), a solidly shaded area 213 in FIG. 25(c) is detected as a motion area which is represented by a motion detection signal, from the current and past TV field periods.

The random number generation circuit 16 generates one of the random numbers such as "−3" to "3", and supplies the random number to the space modulation circuits 27 and 28. The space modulation circuits 27 and 28 respectively shift the pixel positions of the image signals outputted from the static image coding circuit 4 and the moving image coding circuit 5 in a horizontal or vertical direction, by the number of pixels corresponding to the random number. The selection circuit 7 selects one of these space-modulated signals using the motion detection signal from the motion detection circuit 6 as a switching signal. As a result, an image signal corresponding to a solidly shaded area 214 in FIG. 25(d) is obtained.

By using such an image signal that is modulated in the boundary of the motion area, that boundary assumes a random shape, so that the static image coding mode and the moving image coding mode will end up being interspersed in the boundary area. Therefore, the switching between the two coding modes no longer causes a linear change in time characteristic of light emission in the PDP 10. This makes the impact of the switching less significant, so that the switching between static image coding and moving image coding can be done smoothly.

Moreover, the image signal is modulated in the boundary of the motion area, so that the impact of the switching is reduced while coding modes for image areas other than the boundary of the motion area are fixed. Hence unnecessary switching between the two coding modes is suppressed, and an image is displayed with no decrease in signal-noise ratio.

In the third to seventh embodiments, a non-edge area that has little change in gray level is particularly susceptible to an impact of switching between different coding modes. Accordingly, it may be more preferable if the procedure for preventing the linearity of the switching is limited to the non-edge area. In so doing, not only can the impact of the switching in the non-edge area be suppressed, but also the switching of the different coding modes in an edge area can be performed swiftly. Hence coding that is suitable for each image area is implemented without decreasing the average signal-to-noise ratio of the whole image.

The combined use of the second embodiment and any of the third to seventh embodiments is possible.

Figure 26:
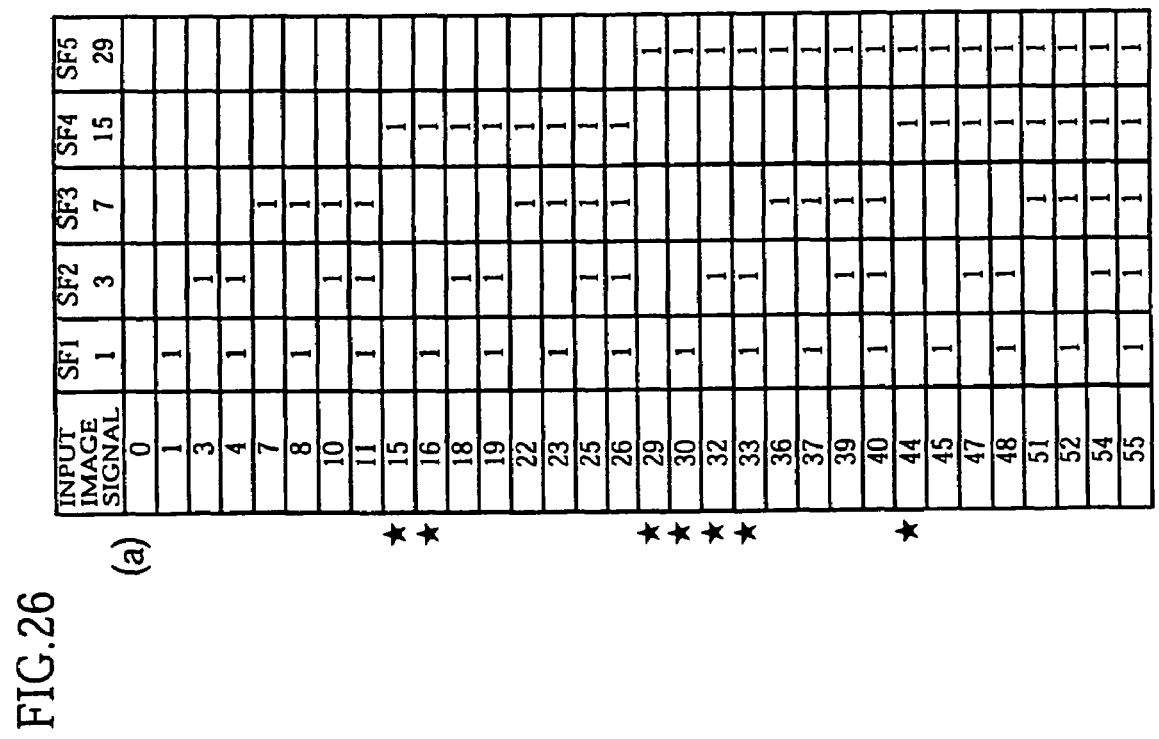
FIGS. 26(a)-26(c) are characteristic diagrams showing the coding pattern and the correlation between input image signal values and reproduced luminance levels when K=2.5.

In the second embodiment, the scaling factor K of the maximum gray level of the current one-frame image (one-TV-field image) with respect to the reference gray level, which is calculated by the display gray level scaling factor setting circuit 14, is assumed to be an integer. However, the scaling factor K does not have to be an integer but may be a decimal. FIG. 26 shows the coding pattern and the correlation between input image signal values and reproduced luminance levels when K=2.5.

As shown in FIG. 26(*a*), among luminance weights of a reference coding pattern (i.e. the coding pattern shown in FIG. 14(*a*) whose sub-field luminance weights are "1, 2, 3, 6, 10" in order of time), the smaller luminance weights are multiplied by values no greater than K whereas the larger luminance weights are multiplied by values greater than K, to set the luminance weights for the coding pattern corresponding to K=2.5. Each pixel within the current frame is then displayed using this coding pattern.

Specifically, the coefficients for multiplying the luminance weights "1, 2, 3, 6, 10" are "1, 1.5, 2.33, 2.5, 2.9".

By such setting the luminance weights, not only can the maximum luminance be increased, but also the dynamic range of reproduced luminance levels can be widened. As shown in FIGS. 26(*b*) and 26(*c*) concerning the correlation between input image signal values and reproduced luminance levels, the luminance level is kept low against the input in the low gray-level range, with it being possible to widen the dynamic range while maintaining the resolution in the low gray-level range.

In the above embodiments, the static image coding circuit 4 and the moving image coding circuit 5, or the image coding circuits 21-23, generate coded image signals which can be expressed by combinations of sub-fields in the sub-field control circuit 8, and the selection circuit selects one of the coded image signals and supplies it to the sub-field control circuit 8. Alternatively, the selection signal may be supplied to the sub-field control circuit 8 so that the sub-field control circuit 8 can convert the selected image signal to field information.

INDUSTRIAL APPLICABILITY

The image display apparatus of the invention can be used to display a high-quality gray-scale image that exhibits an excellent picture quality or a wide dynamic range.

The invention claimed is:

1. An image display apparatus, in which a current TV field period is divided into a plurality of sub-fields that are respectively given luminance weights and are arranged in order of time, and a gray-scale image for the current TV field period is displayed by coding input pixel image signals using different coding modes that are switched in accordance with an amount of movement from an image of a past TV field period to the image of the current TV field period, comprising:
    a first circuit unit in which a combination of sub-fields is selected for each pixel using a signal calculated from the amount of movement, and a light emission state being sustained in each pixel during the selected sub-fields; and
    a second circuit unit for providing an arbitrarily spaced-modulated signal used for switching between the different coding modes so that the different coding modes are interspersedly applied to input pixel image signals that correspond to an image area where the switching between the different coding modes is needed and that show a predetermined characteristic.

2. An image display apparatus, in which a current TV field period is divided into a plurality of sub-fields that are respectively given luminance weights and are arranged in order of time, and a gray-scale image for the current TV field period is displayed by coding input pixel image signals using different coding modes that are switched in accordance with an amount of movement from an image of a past TV field period to the image of the current TV field period, comprising:
    a first circuit unit in which a combination of sub-fields is selected for each pixel using a signal calculated from the amount of movement, and a light emission state being sustained in each pixel during the selected sub-fields; and
    a second circuit unit for providing a signal, used for switching between the different coding modes, which is regularly space-modulated so that the different coding modes are interspersedly applied to input pixel image signals that correspond to an image area where the switching between the different coding modes is needed and that show a predetermined characteristic.

3. An image display apparatus, in which a current TV field period is divided into a plurality of sub-fields that are respectively given luminance weights and are arranged in order of time, and a gray-scale image for the current TV field period is displayed by coding input pixel image signals using different coding modes which are switched in accordance with an amount of movement from an image of a past TV field period to the image of the current TV field period, comprising:
    a first circuit unit in which a combination of sub-fields is selected for each pixel depending on the amount of movement, and a light emission state is sustained in each pixel during the selected sub-fields; and
    a second circuit unit for providing a signal used for switching between the different coding modes, when expressed pixel by pixel as a virtual image of a matrix form in a plane, assumes a shape that contains a zigzag as a main component which turns no more than once in a pixel, so that the different coding modes are interspersedly applied to input pixel image signals that correspond to an image area where the switching between the different coding modes is needed and that show a predetermined characteristic.

4. The image display apparatus of claim 3,
    wherein the shape that contains the zigzag as the main component has a pattern in which adjacent pixels alternate between two states.

5. The image display apparatus of claim 3,
wherein the shape that contains the zigzag as the main component is a shape that randomly combines zigzags each of which turns no more than once in a pixel.

6. The image display apparatus of claim 3,
wherein the input pixel image signals that show the predetermined characteristic correspond to a non-edge image area.

7. An image display apparatus, in which a current TV field period is divided into a plurality of sub-fields that are respectively given luminance weights and are arranged in order of time, and a gray-scale image for the current TV field period is displayed by coding input pixel image signals using different coding modes which are switched in accordance with an amount of movement from an image of a past TV field period to the image of the current TV field period, comprising:

a first circuit unit in which a combination of sub-fields is selected for each pixel depending on the amount of movement, and a light emission state is sustained in each pixel during the selected sub-fields; and a second circuit for providing a modulation signal having periodicity corresponding to no smaller than a pixel interval is applied to input pixel image signals that correspond to an image area where switching between the different coding modes is needed.

8. An image display apparatus, in which a current TV field period is divided into a plurality of sub-fields that are respectively given luminance weights and are arranged in order of time, and a gray-scale image for the current TV field period is displayed by coding input pixel image signals using different coding modes which are switched in accordance with an amount of movement from an image of a past TV field period to the image of the current TV field period, comprising:

a first circuit unit in which a combination of sub-fields is selected for each pixel depending on the amount of movement, and a light emission state is sustained in each pixel during the selected sub-fields; and a second circuit unit for providing input pixel image signals corresponding to an image area where switching between the different coding modes is needed are modulated to shift a display position of the image area.

* * * * *

UNITED STATES PATENT AND TRADEMARK OFFICE
CERTIFICATE OF CORRECTION

PATENT NO. : 7,474,280 B2  Page 1 of 1
APPLICATION NO. : 11/165868
DATED : January 6, 2009
INVENTOR(S) : Kawahara It is certified that error appears in the above-identified patent and that said Letters Patent is hereby corrected as shown below:

On the Title Page:
Please add the following items:
(30)   Foreign Application Priority Data
       April 12, 1999 (JP)    11-103590
       May 17, 1999 (JP)      11-135290
(86)   PCT Application No. PCT/JP2000/002384 (2000/4/12)
(87)   Published as WO 2000/62275 (2000/10/19)

Signed and Sealed this

Eighth Day of September, 2009

David J. Kappos
*Director of the United States Patent and Trademark Office*